(12) United States Patent
Murai

(10) Patent No.: US 6,940,612 B1
(45) Date of Patent: Sep. 6, 2005

(54) DATA CONVERTER, COMPUTER, AND PRINTER

(75) Inventor: Kiyoaki Murai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/581,165

(22) PCT Filed: Oct. 8, 1999

(86) PCT No.: PCT/JP99/05598
§ 371 (c)(1),
(2), (4) Date: Jun. 13, 2000

(87) PCT Pub. No.: WO00/22812
PCT Pub. Date: Apr. 20, 2000

(30) Foreign Application Priority Data

Oct. 13, 1998 (JP) .......................................... 10-306318

(51) Int. Cl.⁷ ............................. G06F 15/00; G03F 3/08
(52) U.S. Cl. ........................................ 358/1.1; 358/518
(58) Field of Search ............................... 358/518, 1.15, 358/1.1, 1.6, 462, 502, 522, 5, 523

(56) References Cited

U.S. PATENT DOCUMENTS

| | | | |
|---|---|---|---|
| 4,805,013 A | | 2/1989 | Dei et al. |
| 5,786,908 A | * | 7/1998 | Liang .......................... 358/518 |
| 6,057,933 A | * | 5/2000 | Hudson et al. .............. 358/1.9 |
| 6,342,950 B1 | * | 1/2002 | Tabata et al. ................ 358/1.6 |

FOREIGN PATENT DOCUMENTS

| | | |
|---|---|---|
| EP | 0 605 892 | 7/1994 |
| EP | 0 816 929 | 1/1998 |
| EP | 0 822 704 | 2/1998 |
| JP | 60-243735 | 12/1985 |
| JP | 63-116855 | 5/1988 |
| JP | 64-42242 | 2/1989 |
| JP | 64-042242 | 2/1989 |
| JP | 6-268856 | 9/1994 |
| JP | 7-222009 | 8/1995 |
| JP | 8-88779 | 4/1996 |
| JP | 8-265587 | 10/1996 |
| JP | 9-069960 | 3/1997 |
| JP | 9-186898 | 7/1997 |
| JP | 9-200549 | 7/1997 |
| JP | 9-226179 | 9/1997 |
| JP | 10-191090 | 7/1998 |

* cited by examiner

Primary Examiner—Kimberly Williams
Assistant Examiner—Saeid Ebrahimi Dehkordy
(74) Attorney, Agent, or Firm—Oblon, Spivak, McClelland, Maier & Neustadt, P.C.

(57) ABSTRACT

A plurality of conversion tables are stored in a computer. Color image data are converted into a specific data form expressible with inks provided in a printing apparatus in the following manner. The procedure first selects a conversion table corresponding to a current printing condition of image among the plurality of conversion tables stored in the computer and stores the selected conversion table into a memory of a data converter. The procedure then supplies color image data of interest to be printed to the data converter and refers to the conversion table stored in the memory, so as to convert the color image data. The procedure accordingly enables the conversion table corresponding to the current printing condition to be read from the computer for the use. This arrangement does not require a large number of conversion tables to be stored in the data converter, but enables conversion of the image data by referring to an appropriate conversion table, thereby attaining high picture-quality image printing, regardless of the printing condition.

20 Claims, 19 Drawing Sheets

*Fig.6(a)*
BEFORE HALFTONING

*Fig.6(b)*
AFTER HALFTONING

Fig. 11

| | Printing Resolution | Type of Printing Paper | Image Attribute | Accuracy | State of Compression |
|---|---|---|---|---|---|
| Conversion Table A | 720*720 | Standard Paper | Natural Image | A | Not done |
| Conversion Table B | 720*720 | Special Paper A | Natural Image | B | Not done |
| Conversion Table C | 1440*720 | Special Paper A | Non-natural Image | B | Done |
| Conversion Table D | 1440*720 | Special Paper B | Non-natural Image | B | Done |
| Conversion Table E | 720*720 | Standard Paper | Natural Image | A | Not done |
| Conversion Table F | 1440*720 | Special Paper B | Non-natural Image | A | Done | is not always coincident with the resolution of the printer. The general-purpose computer or the data converter is also used to regulate the resolution of the color original to be coincident with the resolution of the printer.
DATA CONVERTER, COMPUTER, AND PRINTER

INDUSTRIAL FIELD

The present invention relates to a technique that converts image data input from, for example, a computer, into a specific data form printable by a printer by referring to a preset conversion table and outputs the converted image data.

BACKGROUND ART

In a color printer that is capable of printing color images, all colors are expressed by appropriately mixing a set of three primary colors, that is, cyan (C), magenta (M), and yellow (Y) (subtractive color mixture). In a computer, a digital camera, or another apparatus that supplies a color original to the printer, all colors are expressed by appropriately mixing another set of three primary colors, that is, red (R), green (G), and blue (B) (additive color mixture). Printing a color image accordingly requires conversion of the color expression using R, G, and B into the color expression using C, M, and Y. A general-purpose computer or a special data converter is used for such color conversion. The resolution of the color original supplied to the printer is not always coincident with the resolution of the printer. The general-purpose computer or the data converter is also used to regulate the resolution of the color original to be coincident with the resolution of the printer.

A diversity of methods based on the Neugebauer theory have been known as the techniques of converting the color expression by additive mixture of R, G, and B into the color expression by subtractive mixture of C, M, and Y. Computation based on the Neugebauer theory at every time of color conversion undesirably lowers the speed of conversion. The technique adopted in the color conversion with the computer or the data converter carries out theoretical computation with regard to various values, summarizes the results of the theoretical computation in the form of a conversion table, and refers to the conversion table to enable the quick color conversion.

The color conversion with reference to the same conversion table may cause a subtle variation in color expressed on printing sheet, due to a variation in ground color of the printing sheet and a difference in compatibility of the printing sheet with inks. For example, an image printed on yellowish printing paper has a little yellowish tint. The resulting expressed color may also have a variation according to the degree of ink blot. In order to enable the accurate expression of colors in the original and thereby attain the high-quality printing, a number of conversion tables should be provided corresponding to different types of printing paper. An appropriate conversion table is then selected among the number of conversion tables for the color conversion process.

Each conversion table, however, requires a large storage capacity. Storing all the potentially available conversion tables in the data converter undesirably makes the data converter bulky and increases the manufacturing cost thereof. Storing only a limited number of conversion tables in the data converter, on the other hand, may prevent the color conversion from being performed according to an appropriate conversion table. This may result in inaccurate reproduction of colors in the original and thereby lower the picture quality of the resulting printed image.

The object of the present invention is thus to solve the above problems found in the prior art and to enable appropriate conversion of image data.

DISCLOSURE OF THE INVENTION

At least part of the above and the other related objects is attained by a first data converter of the present invention.

The first data converter of the present invention converts color image data input from a computer into a specific data form expressible with ink provided in a printing apparatus by referring to a preset conversion table and outputs the converted image data. The first data converter includes: a storage unit that stores the conversion table in a rewritable manner, wherein the conversion table is supplied from the computer corresponding to a current printing condition of image in the printing apparatus; an input unit that receives the color image data output from the computer; a conversion unit that refers to the conversion table stored in the storage unit and converts the color image data received by the input unit into the specific data form; and an output unit that outputs the converted image data. The first data converter is constructed as a separate body from the computer.

In the first data converter of this configuration, the color image data input from the computer are converted into the specific data form, which is expressible using inks provided in the printing apparatus, by referring to the preset conversion table. The conversion table, which is supplied from the computer according to the printing condition of image, is stored in a rewritable manner. The conversion of the data form is carried out by referring to the conversion table stored in the above manner. This arrangement enables a conversion table corresponding to the printing condition of image to be used without storing a large number of conversion tables in the data converter. The data converter, which is separate from the computer, thus implements the required conversion adequately.

In accordance with one preferable application of the present invention, the first data converter receives the conversion table in a compressed state from the computer and decode the compressed conversion table to be expanded in the storage unit. The compression of the conversion table reduces the amount of data and thus favorably shortens the time required for the transfer of the conversion table from the computer.

In accordance with another preferable application of the present invention, the first data converter interpolates the conversion table supplied from the computer to a predetermined accuracy and expands the interpolated conversion table in the storage unit. The arrangement of carrying out the interpolation after the input of the conversion table is preferable to the arrangement of inputting the interpolated conversion table, since the former arrangement has the shorter time required for the transfer of the conversion table. The data converter interpolates the input conversion table to a predetermined accuracy. Another advantage of this arrangement is no requirement of adjusting the accuracies of the respective conversion tables stored in the computer.

The conversion table and the accuracy of the conversion table in the specification hereof are described more in detail. The conversion table is a set of mapping combinations of numerical values representing the mapping of the argument to the variable. Each value of an argument may be one-to-one mapped to the value of a variable. In many cases, however, a plurality of arguments determine the value of a variable. In this case, the group of plural arguments is one-to-one mapped to the variable. For example, in the case where the values of two arguments X and Y determine the value of one variable Z, the group including the two arguments (X,Y) is one-to-one mapped to the variable Z. The conversion table in this case includes plural combinations of the group of arguments with the variable. One conversion table generally includes plural combinations of the mapping numerical values. The conversion table in the specification hereof may, however, include only one combination of the mapping numerical values.

The accuracy of the conversion table is specified by the graduation of the combinations of mapping numerical values, which are included in the conversion table, with regard to a certain argument. A variety of methods may be applied to express the graduation of the combinations of mapping numerical values. For example, when combinations of mapping numerical values are present at equal intervals with regard to an argument of interest, the interval between the adjoining combinations of mapping numerical values may represent the accuracy. In another example, in the case where an argument of interest is in a fixed range, the total number of combinations of mapping numerical values may represent the accuracy. In the specification hereof, any method may be applied to express the graduation of the combinations of mapping numerical values.

In accordance with still another preferable application of the present invention, the first data converter receives a current printing condition of image in addition to the color image data. Only when the input printing condition is not coincident with a printing condition corresponding to the conversion table stored in the data converter, the data converter receives another conversion table corresponding to the input printing condition from the computer. When the input printing condition is coincident with the printing condition corresponding to the stored conversion table, it is thought that the conversion table currently input from the computer is identical with the stored conversion table. It is thus not required to currently receive the conversion table from the computer. Only in the case where the two printing conditions are different from each other, the new conversion table is input from the computer. This arrangement favorably prevents the same conversion table from being unnecessarily input a plurality of times into the data converter.

In accordance with another preferable application of the present invention, the first data converter stores a plurality of conversion tables, which are selected by the computer at least based on combinations of a printing resolution of the printing apparatus and a type of printing paper and supplied from the computer. The data converter then receives an image attribute, which determines whether or not the image of interest to be printed is a natural image, in addition to the color image data from the computer. The image attribute in the specification hereof represents a characteristic of the image of interest specified by whether the image is a natural image. The first data converter may carry out the conversion of color image data while changing over a working conversion table to be referred to in a unit of pixel based on the image attribute. In the case where the image of interest to be printed is a combination of several images, this arrangement advantageously ensures the appropriate data conversion by referring to the conversion table suitable for each image.

At least part of the above and the other related objects is further attained by a computer that supplies color image data to a data converter, where the data converter converts the color image data into a specific data form expressible with ink provided in a printing apparatus by referring to a preset conversion table and outputting the converted image data. The computer includes: an image data output unit that outputs the color image data to the data converter; a conversion table storage unit that stores a diversity of the conversion tables mapped to a diversity of printing conditions of image; a conversion table selection unit that selects a working conversion table corresponding to a current printing condition of image in the printing apparatus, among the diversity of conversion tables stored in the conversion table storage unit; and a conversion table output unit that outputs the selected conversion table to the data converter, prior to the conversion of the color image data. The computer is constructed as a separate body from the data converter.

The computer of the present invention supplies color image data to a data converter, which is provided separately from the computer. The data converter refers to the preset conversion table and thereby converts the input image data into the specific data form expressible with ink provided in the printing apparatus. The computer selects a working conversion table corresponding to the current printing condition of image, among the diversity of conversion tables stored corresponding to the diversity of printing conditions of image, and supplies the selected conversion table to the data converter. The data converter carries out the conversion of the input color image data by referring to the working conversion table supplied from the computer. This arrangement causes the computer to supply the working conversion table corresponding to the current printing condition of image, and thus enables the data converter to adequately carry out the required data conversion without storing a large number of conversion tables in the data converter.

In accordance with one preferable application of the present invention, the computer stores the diversity of conversion tables mapped to the diversity of printing conditions of image in a compressive manner. The selected conversion table, which has been stored in the compressive manner, is decoded and then output to the data converter. This arrangement desirably reduces the required storage capacity of the computer for storing the diversity of conversion tables. The computer decodes the compressed conversion table, so that the data converter is not required to have the decoding function. This arrangement thus desirably reduces the size and the manufacturing cost of the data converter.

In accordance with another preferable application of the present invention, the computer interpolates each of the stored conversion tables to a predetermined accuracy, before outputting the working conversion table to the data converter. The conversion tables before the interpolation require a less storage capacity than the conversion tables after the interpolation. The arrangement of storing the diversity of conversion tables in the state before the interpolation thus desirably reduces the required storage capacity for the conversion tables. The working conversion table is output to the data converter after being interpolated to a predetermined accuracy. Another advantage of this arrangement is that there is no necessity of storing the diversity of conversion tables with a fixed accuracy in the computer. The computer carries out the interpolation of the conversion table. The data converter is thus not required to have the interpolation function. This arrangement thus desirably reduces the size and the manufacturing cost of the data converter.

In accordance with still another preferable application of the present invention, the computer selects the working conversion table, at least based on a combination of a printing resolution of the printing apparatus and a type of printing paper as the printing conditions of image. In some cases, the conversion table to be referred to should be changed according to the printing resolution of the printing apparatus and the printing paper. Selection of the working conversion table based on such conditions means selection of the working conversion table corresponding to the current printing condition of image. The reason for changing the conversion table according to the printing resolution of the printing apparatus and the printing paper will be discussed later.

The computer of the present invention may have another preferable application. The computer of this application stores a printing condition corresponding to the latest conversion table supplied to the data converter. In the course of the conversion of color image data, the computer compares the stored printing condition with the current printing condition of image, in order to carry out identification. In the case where the two printing conditions are not coincident with each other, the computer supplies the selected conversion table to the data converter and updates the stored printing condition corresponding to the selected conversion table. This arrangement causes the selected conversion table to be output only when it is required to rewrite the conversion table stored in the data converter. This favorably saves the time required for output of the conversion table.

The computer of the present invention may have still another preferable application. The computer of this application stores the diversity of conversion tables mapped to respective combinations of conditions, which include at least a printing resolution of the printing apparatus, a type of printing paper, and the image attribute. In the course of the conversion of color image data, the computer selects a plurality of conversion tables having different image attributes, at least based on combinations of the printing resolution of the printing apparatus and the type of printing paper, and outputs the plurality of selected conversion tables to the data converter. The computer subsequently identifies an image attribute of an image of interest to be printed, and supplies the identified image attribute, in addition to the color image data, to the data converter. The computer gives an instruction based on the identified image attribute, so as to change over a working conversion table, which is to be referred to for the data conversion, in a unit of pixel. In the case where the image of interest to be printed is a combination of several images, this arrangement advantageously ensures the appropriate data conversion by referring to the conversion table suitable for each image.

At least part of the above and the other related objects is also attained by a second data converter that converts color image data input from an imaging device, such as a digital camera or a color scanner, into a specific data form expressible with ink provided in a printing apparatus by referring to a preset conversion table and outputs the converted image data. The second data converter includes: a conversion table storage unit that stores a diversity of the conversion tables mapped to a diversity of printing conditions of image; a conversion table selection unit that selects a working conversion table corresponding to a current printing condition of image, among the diversity of conversion tables stored in the conversion table selection unit; an input unit that receives the color image data; a conversion unit that converts the color image data received by the input unit by referring to the working conversion table selected by the conversion table selection unit; and an output unit that outputs the converted image data. The second data converter is constructed as a separate body from the imaging device.

The second data converter of the present invention converts the color image data input from an imaging device, such as a digital camera or a scanner, into the specific data form expressible with ink provided in the printing apparatus by referring to the preset conversion table. The data converter selects a working conversion table corresponding to a current printing condition of image among the diversity of conversion tables stored therein and converts the data form of the color image data supplied from the imaging device by referring to the selected conversion table. This arrangement desirably enables the color image data to be output from the imaging device to the data converter not via a computer but directly. The data converter then carries out the conversion of the input color image data into the specific data form expressible with ink provided in the printing apparatus.

In accordance with one preferable application of the present invention, the conversion table is supplied from the imaging device to the second data converter. The second data converter of this arrangement receives the required conversion table as well as the image data from the imaging device at the time of conversion of the data form.

It is preferable that the second data converter of this arrangement communicates with a computer, which is constructed as a separate body from the data converter, to receive a conversion table transferred from the computer, and rewrites the contents of storage in the data converter based on the transferred conversion table. This arrangement causes the required conversion table to be transferred from the computer and accordingly enables the color image data to be appropriately converted without storing all the available conversion tables in the data converter.

In accordance with another preferable application of the present invention, a standard conversion table is stored in advance in the second data converter. When the conversion table corresponding to the current printing condition of image is not present in the conversion table storage unit, the data converter of this application refers to the standard conversion table to carry out the conversion of the color image data. The appropriately selected conversion table is stored as the standard conversion table. Even if the corresponding conversion table is not present in the conversion table storage unit, this arrangement desirably ensures the resulting printed image of favorable picture quality.

At least part of the above and the other related objects is further attained by a printing system, which includes: a data converter in accordance with either one of claims 1 and 12; and a printing apparatus that receives image data having a specific data form converted by the data converter and prints an image corresponding to the input image data. The data converter is constructed integrally with the printing apparatus.

The printing system of the present invention receives the image data converted into the specific data form from the data converter in accordance with either one of claims 1 and 12, which is constructed integrally with the printing apparatus, and prints an image corresponding to the input image data. This arrangement favorably reduces the total size of the printing apparatus and the data converter.

At least part of the above and the other related objects is also attained by a method of converting color image data output from a computer into a specific data form expressible with ink provided in a printing apparatus by referring to a preset conversion table, and outputting the converted image data. The method includes the steps of: selecting a conversion table corresponding to a current printing condition of image among a diversity of conversion tables stored in advance in the computer; storing the selected conversion table in a rewritable manner in a data converter, which is provided separately from the computer; and referring to the stored conversion table, so as to convert the image data supplied from the computer.

This method of data conversion converts the color image data output from the computer into the specific data form expressible with ink provided in the printing apparatus by referring to the preset conversion table, and outputs the converted color image data. The preset conversion table referred to for the data conversion is supplied from the computer and stored in a rewritable manner in the data converter. Namely the method carries out the data conversion by referring to the appropriate conversion table, which corresponds to the current printing condition and is supplied from the computer. This arrangement enables the required data conversion to be appropriately performed without requiring a large number of conversion tables to be stored in the data converter.

The present invention is further directed to another data converter that converts color image data input from a computer into a specific data form expressible with ink provided in a printing apparatus by referring to a preset conversion table and outputs the converted image data. The another data converter includes: a storage unit that stores the conversion table in a rewritable manner, wherein the conversion table is supplied from the computer corresponding to a current printing condition of image; an input unit that receives the color image data; a conversion unit that refers to the conversion table stored in the storage unit and converts the color image data received by the input unit; and an output unit that outputs the converted image data. The data converter is attached to the computer.

BRIEF DESCRIPTION OF THE DRAWINGS

FIG. 6 conceptually shows an example of a half toning process;

FIG. 11 is a mapping table stored in the computer of the embodiment;

BEST MODES OF CARRYING OUT THE INVENTION

1. Structure of Apparatus

Figure 1:
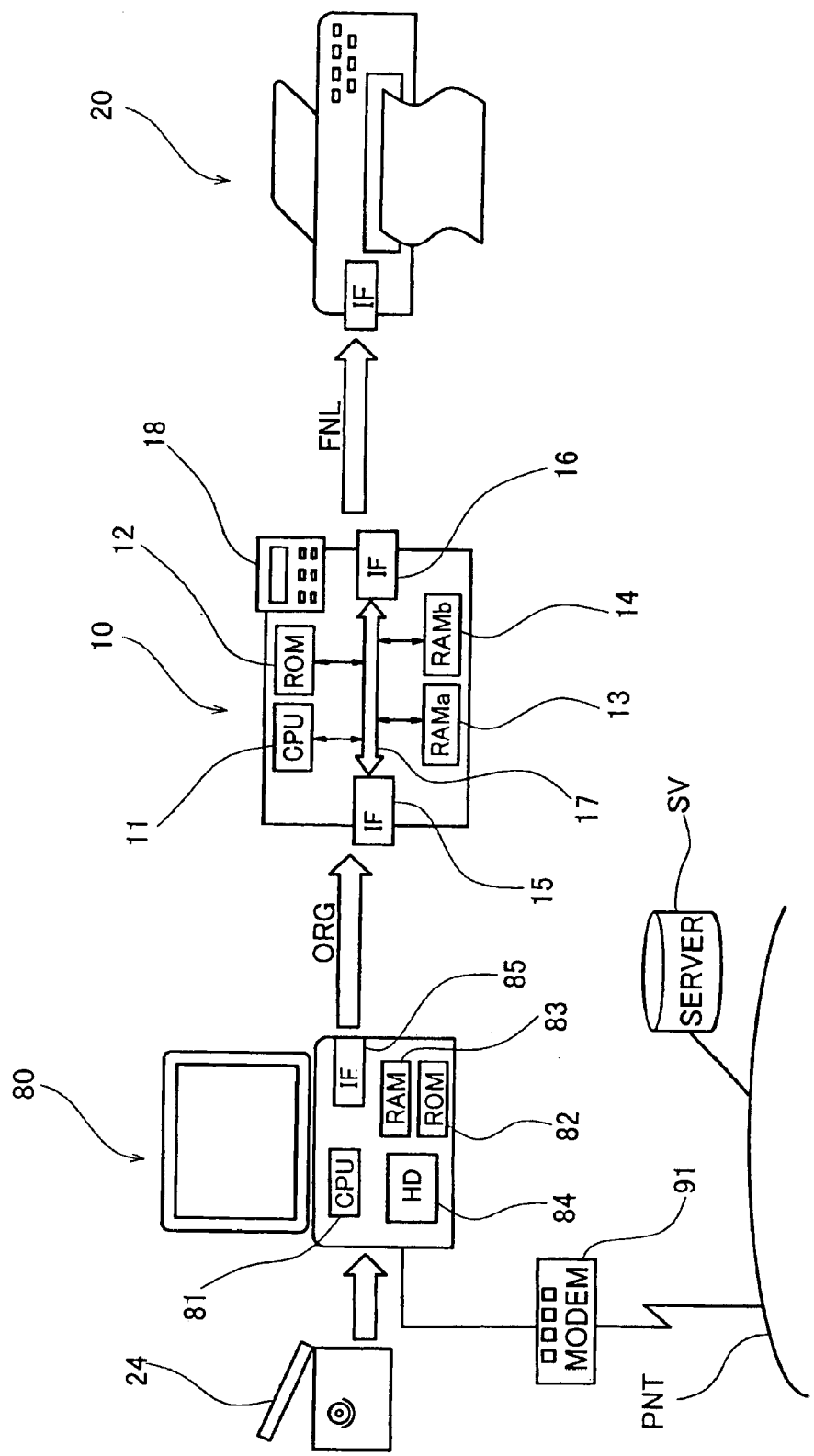
FIG. 1 illustrates the structure of a printing system including a data converter in one embodiment according to the present invention.

One mode of carrying out the present invention is described below as a preferred embodiment. FIG. 1 illustrates the structure of a printing system including a data converter 10 in the embodiment of the present invention. The illustrated printing system includes the data converter 10 connected to a computer 80 and a printer 20. The computer 80 reads and executes predetermined programs to function, in combination with the data converter 10 and the printer 20, as the printing system as a whole. The computer 80 outputs color image data ORG to the data converter 10. The data converter 10 converts the input color image data ORG into a specific data form printable by the printer 20 and outputs converted color image data FNL to the printer 20. The printer 20 creates dots on printing paper, based on the converted color image data FNL input from the data converter 10, so as to print a color image. The series of the processing enables a resulting color image corresponding to the color image data output from the computer to be recorded on the printing paper.

The computer 80 includes a CPU 81 that executes a variety of operations, a ROM 82, a RAM 83, a hard disk 84, and an interface 85. These elements are mutually connected via a bus (not shown), so as to allow mutual transmission of data. A diversity of programs and data required for the execution of the various operations by the CPU 81 are stored in advance in the ROM 82. A diversity of programs and data required for the execution of the various operations by the CPU 81 are registered temporarily in the RAM 83. The hard disk 84 is used to store a diversity of programs and data that can not been stored in the ROM 82 or the RAM 83, because of the limited storage capacities thereof. The interface 85 causes the computer 80 to transmit data to and from external equipment.

A color scanner 24 connected externally to the computer 80 reads a color original and converts the scanned color original into image data recognizable by the computer 80. Connection of the computer 80 with a public telephone network PNT via a modem 91 enables the computer 80 to receive any required data from a server SV that is present on an outside network.

A supply of electric power to the computer 80 activates the operating system stored in the ROM 82 and the hard disk 84 and runs a variety of application programs under the control of the operating system. Color originals to be printed are prepared using the application programs and output to the data converter 10 via the interface 85. Color images input from the outside via the color scanner 24 or the modem 91 are also processed to color originals using the application programs.

The data converter 10 includes a CPU 11 that executes a variety of operations, a ROM 12 in which a diversity of programs and data required for the various operations are stored in advance, a RAM a13, in which data input from the computer 80 are registered, a RAM b14, in which results of the various operations are temporarily registered, an interface 15 that receives data input from the outside, and an interface 16 that outputs data to the outside. These elements are mutually connected via a bus 17, so as to allow mutual transmission of data. A supply of electric power to the data converter 10 activates the programs stored in the ROM 12 to make the data converter 10 ready for the data input from the computer 80.

In the process of data conversion, the computer 80 outputs first a variety of required data for the data conversion to the data converter 10 and subsequently the color image data ORG. The data converter 10 causes the variety of required data for the data conversion to be registered in the RAM a13 and converts the subsequently input color image data ORG into a data form printable by the printer 20. The CPU 11 included in the data converter 10 carries out the data conversion according to a predetermined program. The converted data are temporarily registered in the RAM b14 and output via the interface 16 as the color image data FNL of a specific data form printable by the printer 20.

The printer 20 is a color printer that is capable of printing color images. The printer 20 adopted in this embodiment is an ink jet printer that creates dots of four different color inks, that is, cyan magenta, yellow, and black, to print a color image on printing paper. Other printers, such as a laser printer and a thermal transfer printer, may also be used for the printer 20.

Figure 2:
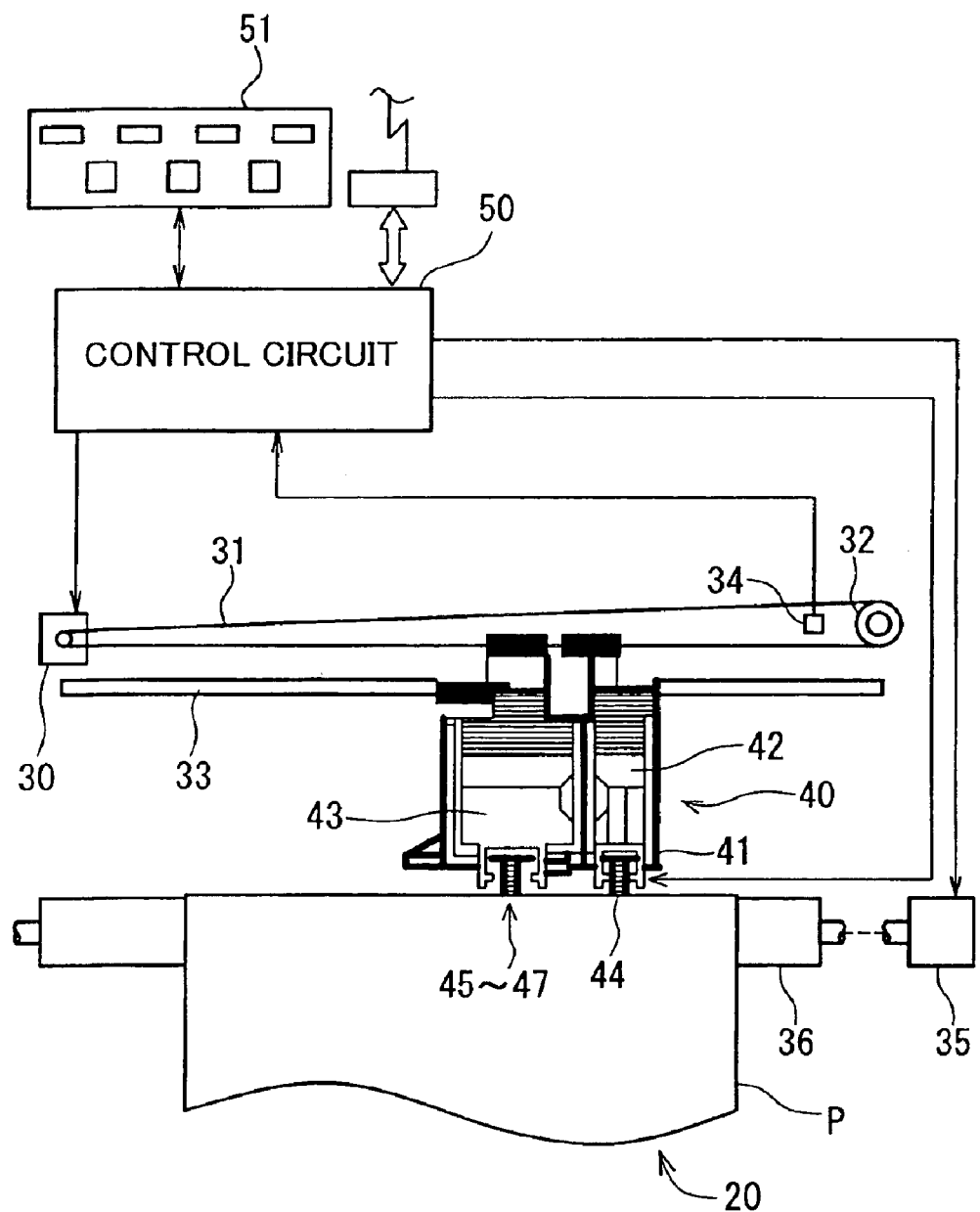
FIG. 2 schematically illustrates the structure of a printer used in the embodiment.

FIG. 2 schematically illustrates the structure of the color printer 20 in this embodiment. The color printer 20 has a mechanism of driving a print head 41 mounted on a carriage 40 to implement ink ejection and dot creation, a mechanism of moving the carriage 40 forward and backward along an axis of a platen 36 by means of a carriage motor 30, a mechanism of feeding a sheet of printing paper P by means of a sheet feed motor 35, and a control circuit 50. The mechanism of reciprocating the carriage 40 along the axis of the platen 36 includes a sliding shaft 33 that slidably holds the carriage 40 arranged in parallel with the axis of the platen 36, a pulley 32 that is linked with the carriage motor 30 via an endless drive belt 31 spanned therebetween, and a position sensor 34 that detects the position of the origin of the carriage 40. The mechanism of feeding the printing paper P includes the platen 36, the sheet feed motor 35 that rotates the platen 36, a sheet-feed assist roller (not shown), and a gear train (not shown) that transmits the rotation of the sheet feed motor 35 to the platen 36 and the sheet-feed assist roller. The control circuit 50 transmits signals to and from a control panel 51 of the printer 20 and adequately controls the operations of the sheet feed motor 35, the carriage motor 30, and the print head 41. The sheet of printing paper P fed to the color printer 20 is held between the platen 36 and the sheet-feed assist roller and fed by a predetermined length according to a rotational angle of the platen 36. Ink cartridges 42 and 43 are detachably attached to the carriage 40. Each ink kept in the ink cartridge is ejected from the print head 41 to create dots on the printing paper according to the method discussed below.

Figure 3A:
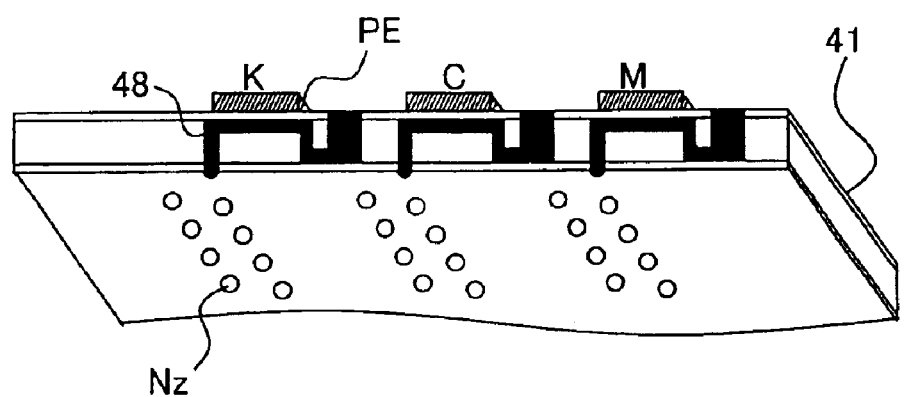
FIG. 3 shows the principle of dot creation by the printer used in the embodiment.
Figure 3B:
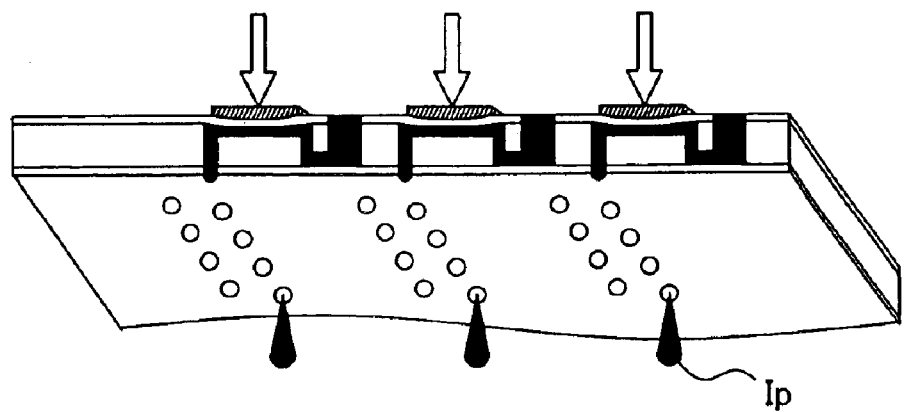

FIG. 3(a) shows the internal structure of respective ink ejection heads. Forty eight nozzles Nz are formed in each of the ink ejection heads 44 through 47 corresponding to the respective color inks. Each nozzle has an ink conduit 48 and a piezoelectric element PE arranged on the ink conduit 48. As is known by those skilled in the art, the piezoelectric element PE deforms its crystal structure by application of a voltage and implements an extremely high-speed conversion of electrical energy into mechanical energy. In this embodiment, when a preset voltage is applied between electrodes on either end of the piezoelectric elements PE for a predetermined time period, the piezoelectric element PE is expanded for the predetermined time period to deform one side wall of the ink conduit 48 as shown in FIG. 3(b). The volume of the ink conduit 48 is reduced according to the expansion of the piezoelectric element PE. A certain quantity of ink corresponding to the reduction is ejected as an ink particle Ip from the nozzle Nz at a high speed. The ink particle Ip soaks into the printing paper P set on the platen 36 and thereby creates a dot on the printing paper P.

The color printer 20 having the hardware configuration discussed above drives the carriage motor 30 to move the ink ejection heads 44 through 47 of the respective color inks relative to the printing paper P in a main scanning direction, and drives the sheet feed motor 35 to shift the printing paper P in a sub-scanning direction. Under the control of the control circuit 50, the print head 41 is driven at adequate timings while the main scans and the sub-scans of the carriage 40 are repeated. The color printer 20 accordingly prints a color image on the printing paper.

The color printer 20 adopted in this embodiment uses piezoelectric elements PE to eject ink as discussed above. The principle of the present invention may, however, be applied to other printers that eject ink according to different techniques. For example, the technique of the present invention may be applicable to a printer that ejects ink by means of bubbles that are generated in an ink conduit by a supply of electricity to a heater disposed in the ink conduit.

2. Data Conversion Process

Figure 4:
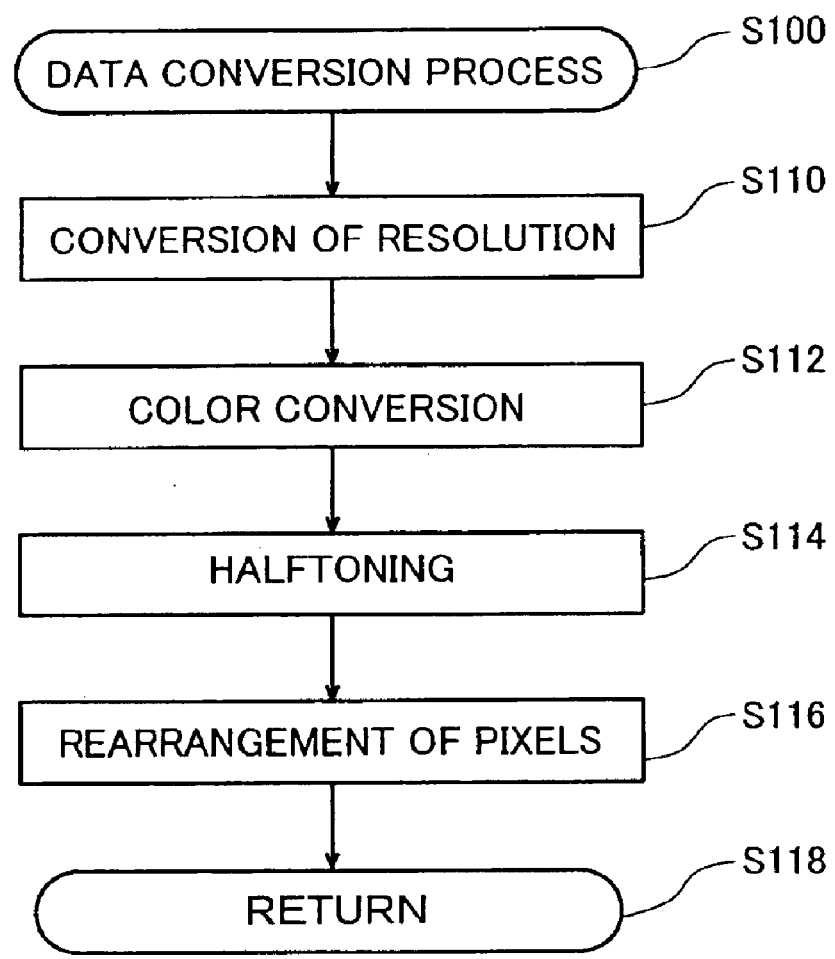
FIG. 4 is a flowchart showing the outline of a data conversion process executed in the embodiment.

The color printer 20 has the function of printing color images. The data form of image data processible by the color printer 20 is, however, not coincident with the data form of image data processible by the computer 80 and other imaging devices, such as a digital camera. Conversion of the data form is accordingly required to enable a color image input from, for example, the computer 80 to be printed by the color printer 20. FIG. 4 is a flowchart showing the outline of a data conversion process.

The computer 80 processes an image as matrix data, which are like a large table including a large number of numerals arranged in columns and rows (for example, 1000 columns and 1000 rows). Each box unit in the table is referred to as the pixel. The computer 80 interprets the value of each pixel (that is, the tone value) as the brightness at the point. A black and white image is considered to be a distribution of bright points and dark points on a plane. The black and, white image is accordingly expressed by an adequate distribution of the tone values. In the computer 80, the tone value generally takes any value in the range of 0 to 255. The tone value equal to 0 represents the darkest state, and the tone value equal to 255 represents the brightest state. The computer 80 processes a color image as a composite of an R image, a G image, and a B image, that is, contrast images of red, green, and blue colors.

In order to cause the image data to be printed by the printer 20, the procedure first carries out a resolution conversion process (step S110) as discussed below. It is here assumed that image data including pixels of 1000 in length× 1000 in width are printed in an area of the printing paper defined by the dimensions of 10 cm in length by 10 cm in width. In this case, one pixel corresponds to 1 mm on the printing paper. The mapping of one pixel to the length on the printing paper naturally depends upon the area in which the image is to be printed. Each printer creates an intrinsically designed number of dots per unit length. Namely the number of dots created per each pixel is varied according to the area in which the image is to be printed. The varying number of dots created per each pixel is inconvenient to the data processing. It is accordingly desirable to regulate the number of dots created per each pixel to a preset value by skipping some pixels to reduce the total number of pixels or by carrying out interpolation to increase the total number of pixels. This process is generally referred to as the resolution conversion process.

After the resolution conversion process, the procedure starts a color conversion process at step S112. As described previously, the computer generally expresses color images with a set of three colors, that is, red (R), green (G), and blue (B), whereas the printer typically expresses color images with another set of three colors, that is, cyan (C), magenta (M), and yellow (Y). It is accordingly required to convert the color expression using the three colors R, G, and B to the color expression using the another three colors C, M, and Y. The color conversion process implements such conversion. The color conversion process converts R, G, and B image data, each having 256 tones, into C, M, and Y image data, each having 256 tones. The details of such color conversion will be discussed later.

Figure 5A:
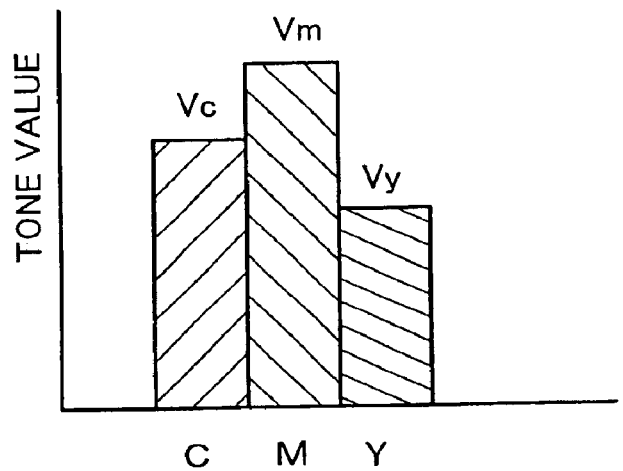
FIG. 5 conceptually shows an example of an under color removable process.
Figure 5B:
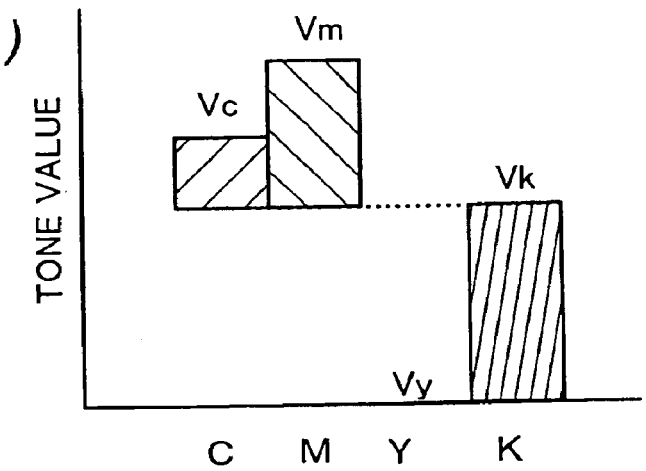
Figure 5C:
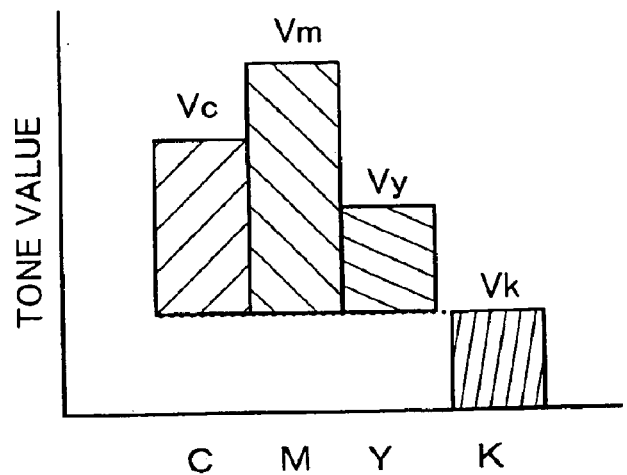

The color conversion process includes an under color removal process. The under color removal process extracts a black color (K) component from the C, M, and Y image data, so as to generate image data of the four colors C, M, Y, and K. The concept of the under color removal is shown in FIG. 5. FIG. 5(a) shows tone values of a pixel, which is subject to the under color removal. In this example, the pixel has the tone values of C, M, and Y equal to Vc, Vm, and Vy, respectively. In theory, mixing equal quantities of the three colors C, M, and Y gives K (black color). Namely the state of FIG. 5(a) is replaced by the state of FIG. 5(b) where K of the tone value Vy, C of a tone value (Vc−Vy), and M of a tone value (Vm−Vy) are mixed. This replaces equal quantities of the three color inks C, M, and Y with the equal quantity of one color ink K and thereby decreases the total quantity of ink consumption, which is desirable from the viewpoint of the ink duty. Another effect is to make the printed image sharper as a whole. In the actual state, the replacement is not performed theoretically by taking into account the lowered lightness of the whole image. The actual procedure replaces K of a tone value Vk, which is smaller than Vy, for the equal quantities of the three color C, M, and Y (see FIG. 5(c)). This implements the under color removal.

Figures 6A, 6B:
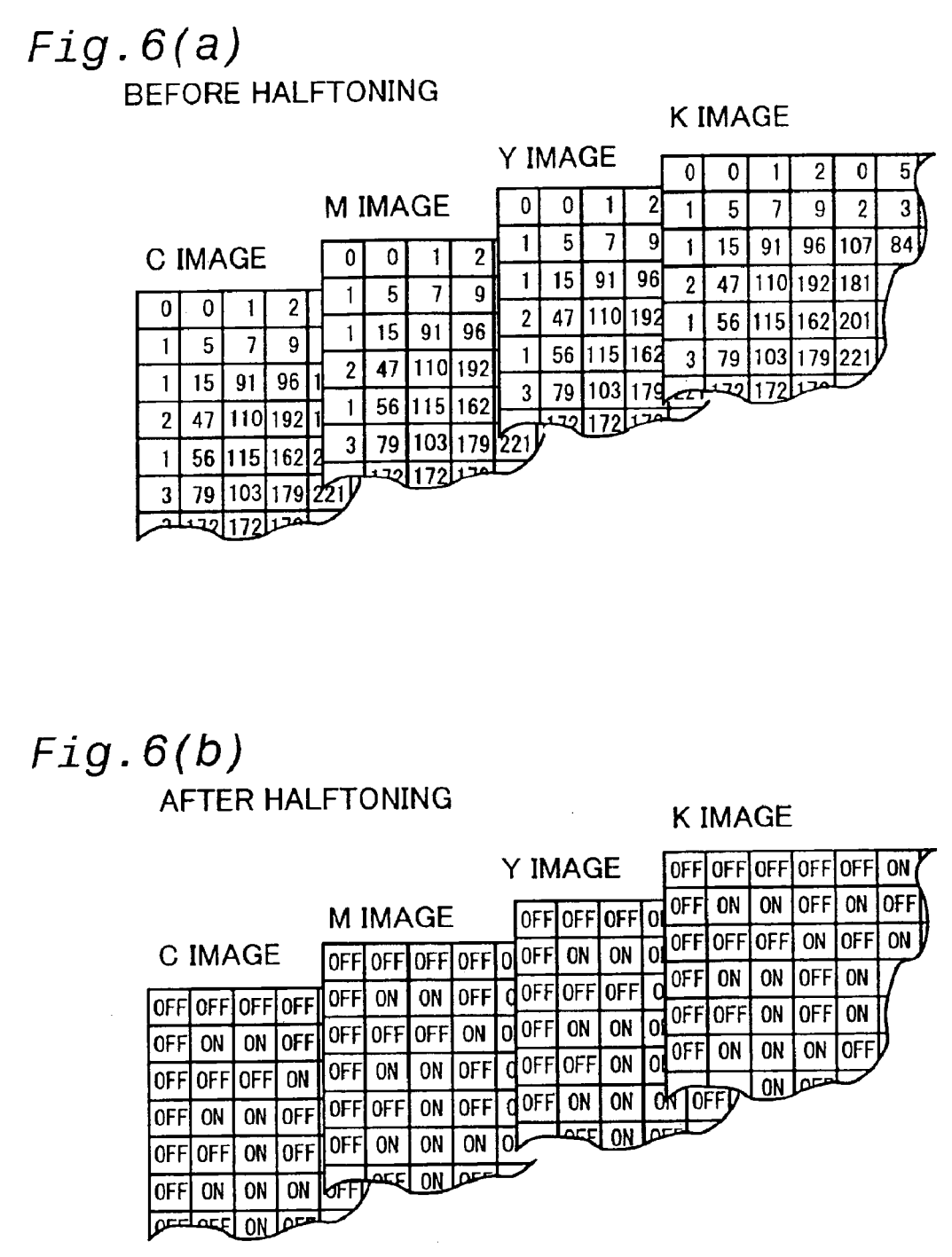

Referring back to FIG. 4, after the color conversion process, the procedure starts a halftoning process at step S114. The color-converted image data are matrix data of four colors C, M, Y, and K. Each pixel takes a tone value selected out of the 256 tones (see FIG. 6(a)). The printer creates dots to print an image on the printing paper, and typically has only two levels, that is, dot-on and dot-off. There are variable dot printers and other multi-level printers that can print multi-level dots including an intermediate state, for example, by varying the size of the dot to be created. These printers, however, still have a relatively small number of expressible tones. It is thus required to convert the image having 256 tones into an image having an extremely small number of tones expressible by the dot on-off conditions. Such conversion is called the halftoning process. FIG. 6 shows an example of the halftoning process. FIG. 6(a) shows the color-converted image data prior to the halftoning process, and FIG. 6(b) shows the image data after the halftoning process. One of the 256 tone values is written in each pixel included in the image that is subject to the halftoning process. After the halftoning process, each pixel has one of the two levels, that is, the dot ON or the dot OFF.

The simple binarization process of the image data having 256 tones compares the tone value of each pixel with a predetermined threshold value and carries out the binarization based on the results of the comparison. A resulting printed image after such binarization process may, however, cause a phantom outline, which is actually not present in the original image. In order to avoid such troubles, a diversity of methods have been proposed and widely used for the halftoning process; for example, the systematic dither method and the error diffusion method.

Referring back again to FIG. 4, after the halftoning process, the procedure rearranges the pixels at step S116. The processing of step S116 rearranges the data converted by the halftoning process to the form representing the dot-on and -off conditions in a specific sequence to be transferred to the printer 20. As mentioned previously, the printer 20 drives the print head 41 while repeating the main scans and the sub-scans of the carriage 40, so as to create dots on the printing paper P. The pixel rearrangement process rearranges the image data representing the dot-on and off conditions in a specific order, according to which the print head 41 creates dots, by talking into account the movements of the carriage 40. The rearranged image data are output as the image data FNL of the data form printable by the printer 20. This completes the series of the data conversion process.

3. Color Conversion

Figure 7:
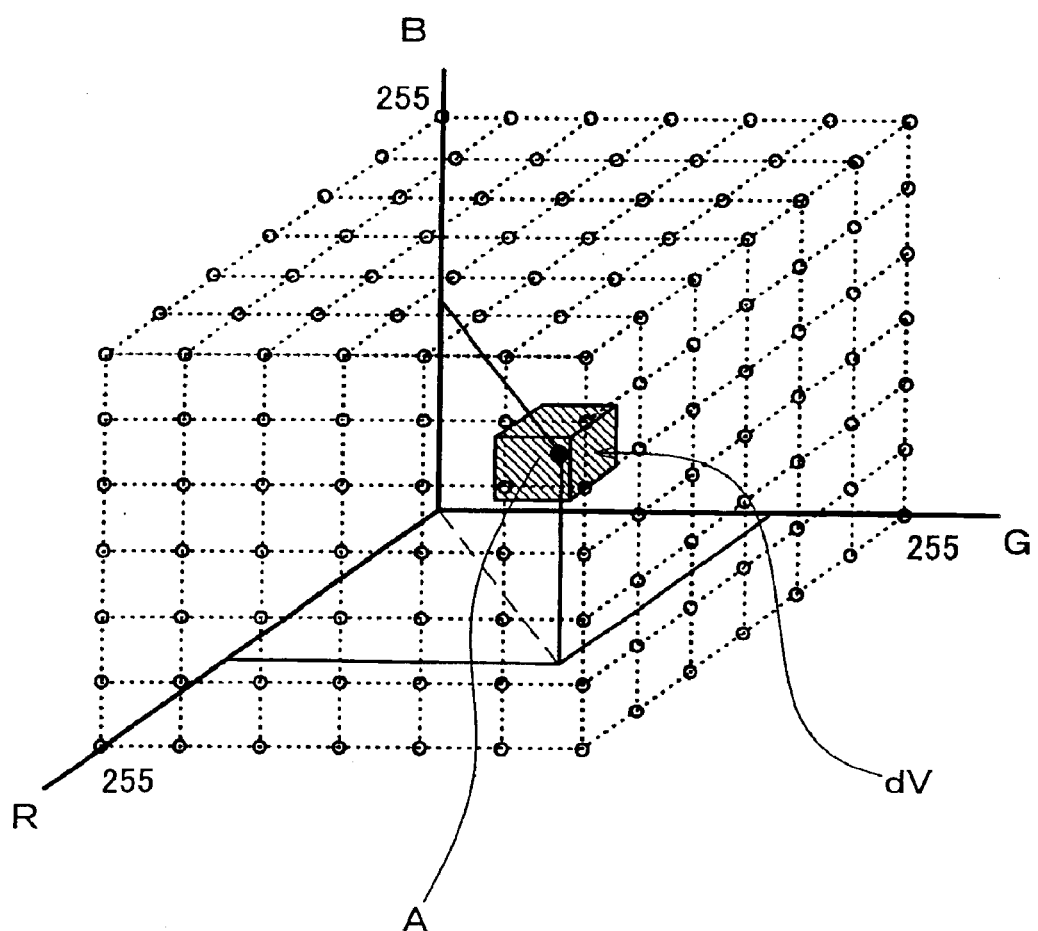
FIG. 7 conceptually shows an example of a conversion table used in the embodiment.

The conversion of the color expression using R, G, and B into the color expression using C, M, and Y is carried out by referring to a preset conversion table. FIG. 7 conceptually shows a conversion table that is referred to in the process of color conversion. As discussed above, the computer 80 combines the R, G, and B images together to express a color image. Each of the pixels constituting the respective images takes a tone value in the range of 10 to 255. A three-dimensional space (RGB color space) defined here has three axes representing tone values of R, G, and B. Each color expressed on the computer is mapped to the coordinates of one point included in a cube of 255 shown in FIG. 7. The cube is divided into small cubes as shown in FIG. 7. The expression of the color defined by the coordinates at each vertex of each small cube is changed from the color system using R, G, and B to the color system using C, M, and Y The results of the conversion are stored at each vertex. This gives a set of mapping pairs of numerical values, each representing the mapping of the coordinates in the RGB color space to the tone values of C, M, and Y. The color conversion is carried out in the following manner by referring to the conversion table thus created.

The method of computing the tone values of C, M, and Y from the coordinates values of each vertex included in the RGB color space will be discussed later. The number of the mapping pairs of the coordinates in the RGB color space and the tone values of C, M, and Y is the third power of the number of divisions on each side of the cube. Each vertex of the cube has three coordinates values in the RGB color space and the three tone values of C, M, and Y. The conversion table accordingly includes a large number of data, and an extremely large storage capacity is required to store the conversion table.

The color expression using R, G, and B is readily converted into the color expression using C, M, and Y by referring to the conversion table. The following description regards an example, in which a certain color expressed by a point A in the RGB color space shown in FIG. 7 is converted into the color expression by C, M, and Y The procedure first selects a small cube (dV) including the point A among a number of small cubes divided in the process of creating the converting table. There is only one small cube including the point A, unless the point A is present on any side of the small cube. In the case where the point A is present on any one side of the small cube, an arbitrary small cube including the point A should be selected. The procedure then refers to the conversion table created in advance and reads the tone values of C, M, and Y with regard to the respective vertexes of the selected small cube. The procedure subsequently interpolates the tone values of C, M, and Y with regard to the respective vertexes, so as to determine the tone values of C, M, and Y with regard to the point A, based on the positional relationship between these vertexes and the point A in the RGB color space. A diversity of known methods, for example, the linear interpolation method, may be applied for this interpolation.

The tone values of C, M, and Y with regard to each vertex of the division or small cube is calculated from the coordinate values of the vertex in the RGB color space according to the following procedure. The Neugebauer theory is applied for this calculation, and a variety of techniques based on the Neugebauer theory have been proposed. The Neugebauer theory well explains the reason why the conversion table to be referred to should be changed by the variation in printing resolution of the printing apparatus and the difference in type of printing paper. The Neugebauer theory is briefly described below.

Figure 8A:
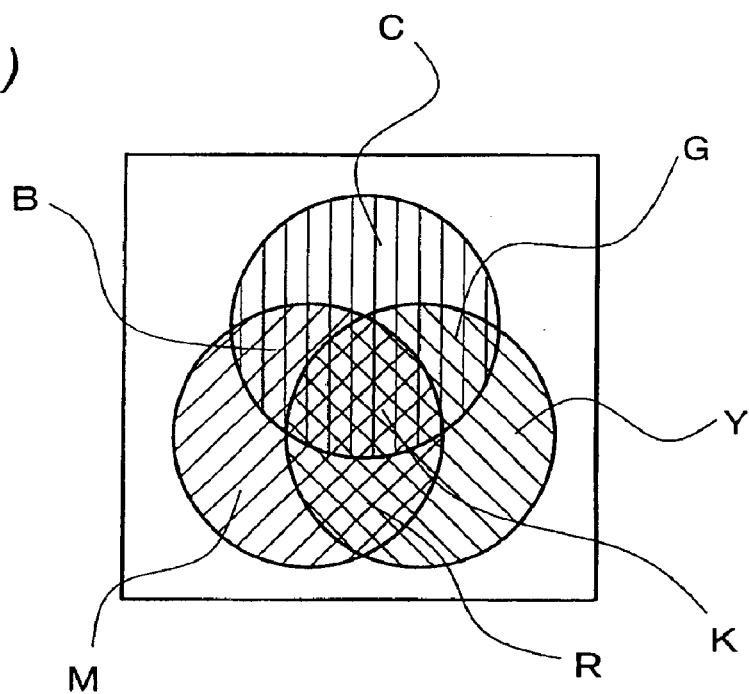
FIG. 8 conceptually shows the Neugebauer theory.

In the case where the three color inks, C, M, and Y, are used for printing, there are eight possible states of ink mixing. The eight possible states include the unmixed, pure states of the respective inks, C, M, and Y, the mixed state of C and M, the mixed state of C and Y, the mixed state of Y and M, the mixed state of all the three inks C, M, and Y, and the state of no presence of any inks. FIG. 8(a) schematically illustrates these eight possible states. The color expressed in a minute area on the printing paper is specified by the proportion of these eight possible states and the stimulus values allocated to the respective states.

The stimulus values of a certain color are numerical values representing the degrees of reddish tint, greenish tint, and bluish tint given by the certain color. There are three stimulus values of R, G, and B corresponding to the red, green, and blue colors. The stimulus values are determined by photoelectric tristimulus colorimetry or spectroscopic tristimulus colorimetry. Determining one set of the R, G, and B stimulus values specifies one color.

Determination of the R, G, and B stimulus values with regard to a minute area on the printing paper accordingly enables specification of the color expressed in the minute area. The R stimulus value with regard to the minute area is obtained by accumulating the R stimulus values allocated to the eight possible states with weights of area fractions. The G stimulus value and the B stimulus value are obtained in a similar manner. The R, G, and B stimulus values with regard to the minute area are calculated from the observed R, G, and B stimulus values with regard to the eight possible states and the area fractions of the respective states.

The Neugebauer theory assumes that the respective color inks C, M, and Y stochastically overlap, and calculates R, G, and B stimulus values Rf, in Gf, and Bf with regard to the minute area according to Equation (1) given below, where kc, km, and ky respectively denote the dot percents of the C, M, and Y inks. The expression of 'stochastically overlap' here means that there is no specific consideration to avoid the overlap of the respective color inks. The 'dot percent' here represents an area fraction of each color ink in the minute area. The area fractions of the C, M, and Y inks are substantially equivalent to the tone values of C, M, and Y.

Rw, Rc, Rm, and Ry respectively denote the R stimulus value of the ground color of printing paper, the R stimulus value by the C ink, the R stimulus value by the M ink, and the R stimulus value by the Y ink. Rcm denotes the R stimulus value in the overlapped area of the C ink and the M ink, Rmy denotes the R stimulus value in the overlapped area of the M ink and the Y ink, and Ryc denotes the R stimulus value in the overlapped area of the Y ink and the C ink. Rcmy denotes the R stimulus value in the overlapped area of the C, M, and Y color inks. Like the R stimulus values, the G stimulus values and the B stimulus values are defined with regard to the ground color of printing paper and the overlap of the respective color inks.

Application of the Neugebauer theory enables conversion of the color expression using R, G, and B into the color expression using C, M, and Y. The conversion is implemented by calculating Equation (1) given above to find a set of C, M, and Y tone values mapped to the R, G, and B tone values of a desired color. Such calculation, however, requires an undesirably long time. It is thus practically impossible to carry out such calculation and color conversion with regard to each pixel in the process of printing a color image. The technique of the present invention accordingly stores the conversion table discussed previously and refers to the conversion table for quick color conversion.

Figure 8B:
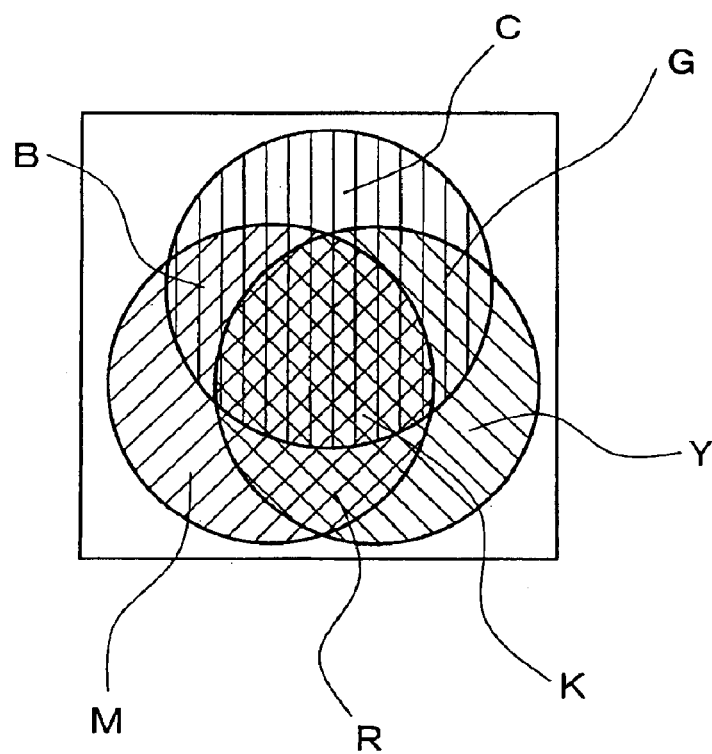

The Neugebauer theory well explains the reason why the conversion table to be referred to should be changed by the variation in ink blot due to the difference in type of printing paper and the variation in printing resolution of the printing apparatus. FIG. 8(b) shows the eight possible states of ink mixing with regard to another type of printing paper that has a greater degree of ink blot than that of the type of printing paper adopted in FIG. 8(a). The comparison between these two diagrams shows that the proportion of the eight possible states of ink mixing is significantly varied by the degree of ink blot of the printing paper. In general, the stimulus value in an overlapped area of plural inks is different from the sum of the stimulus values of the corresponding inks in the unmixed, pure state. The variation in mixing state of inks varies the resulting color expression. In some cases, the conversion table used for the color conversion should thus be changed according to the variation in ink blot due to the difference in type of printing paper.

The Neugebauer theory also explains the reason why the conversion table should be changed by the variation in printing resolution of the printing apparatus. The higher printing resolution increases the number of ink dots created per minute area. Since the size of the dot is fixed, however, the higher printing resolution results in increasing the fractions of the overlapped areas of plural inks and thereby causes the state of FIG. 8(b). In some cases, the conversion table should thus be changed by the variation in printing resolution.

Figure 9A:
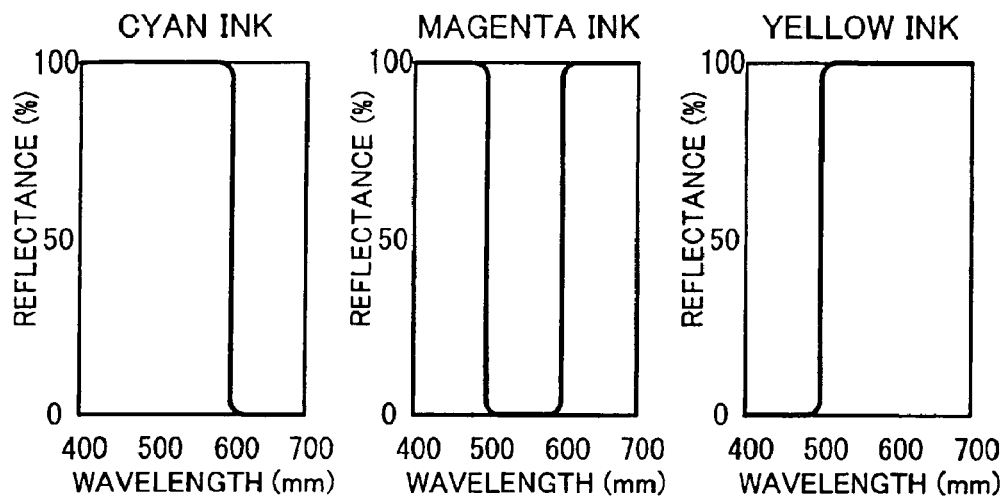
FIG. 9 shows examples of observed spectral characteristics of inks used for color printing.
Figure 9B:
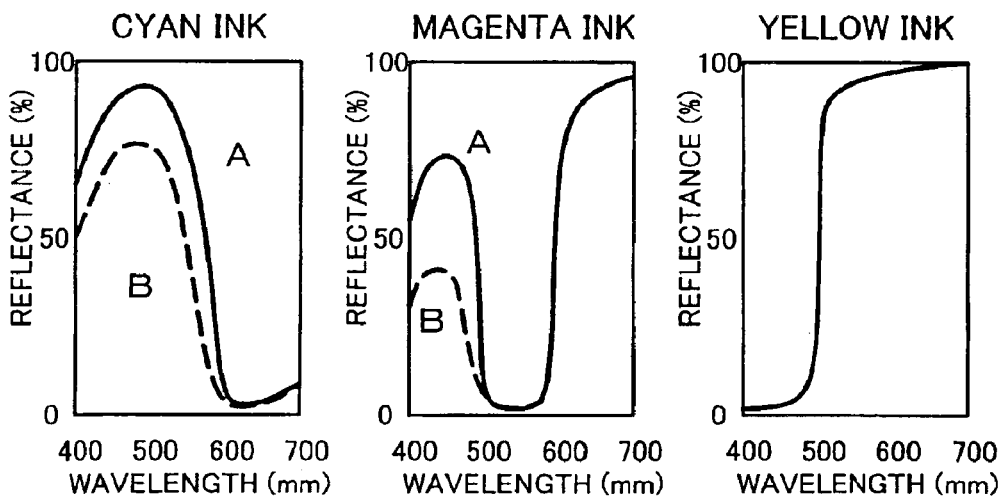

In some cases, the conversion table should further be changed by the type of inks used for printing. FIG. 9 is graphs showing the observed wavelengths of reflected rays when ink is irradiated with white light. FIG. 9(a) shows the case of ideal inks, and FIG. 9(b) shows the case of actual inks. It is generally assumed that the respective inks C, M, and Y have the ideal characteristics as shown in FIG. 9(a). The conversion table used in the actual state should, however, be specified by taking into account the characteristics of the actual inks. FIG. 9(b) shows the results of the measurement with regard to two different sets of inks C, M, and Y. Between the two sets of inks, while the characteristics of the yellow ink (Y) C) are practically the same, the characteristics of the cyan ink (C) and the magenta ink (M) are significantly different. In the event that a plurality of different sets of inks are available, the conversion table according to the characteristics of inks should be referred to for color conversion.

4. Transmission of Conversion Table in this Embodiment

Figure 10:
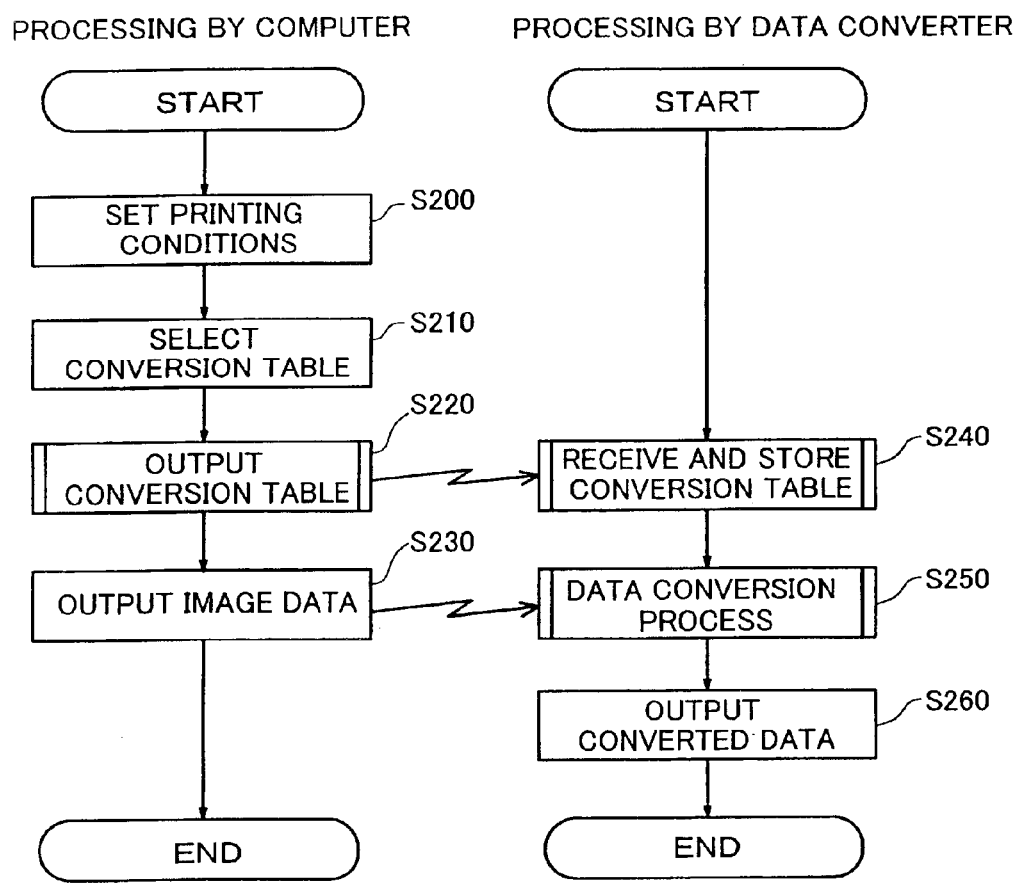
FIG. 10 is a flowchart showing a processing routine executed in the embodiment.

The following describes transmission of the conversion table carried out in this embodiment. In the structure of the embodiment, the computer 80 supplies the conversion table to the data converter 10, and the data converter 10 refers to the conversion table to carry out conversion of image data. FIG. 10 is a flowchart showing a printing operation using the conversion table carried out by the computer and the data converter. The left column shows the flow of the processing by the computer, and the right column shows the flow of the processing by the data converter.

When the program starts a printing operation, the computer 80 first sets printing conditions (step S200). The concrete procedure of step S200 gives pieces of information regarding the printing resolution of the printer 20 actually used for printing and the type of printing paper to the computer 80. In this embodiment, the operator specifies these conditions on the screen of the computer 80. In accordance with one possible modification, the operator specifies the printing conditions on a setting panel 18 provided in the printer 20. In accordance with another possible modification, the computer 80 takes in the required pieces of information through communications with the printer 20.

The computer 80 subsequently selects an appropriate conversion table used for color conversion, based on the preset printing information (step S210). A number of conversion tables mapped to the various printing conditions are stored in the hard disk 84, which is incorporated in the computer 80. As described previously, the conversion table occupies a large storage capacity. The conversion tables are accordingly stored in the mass storage hard disk 84. A suitable conversion table is read from the hard disk 84 according to the requirements, stored in the RAM a13 and used for the color conversion. The computer 80 stores a mapping table as shown in FIG. 11, in addition to the conversion tables. The mapping table registers the pieces of information regarding the printing resolution, the type of printing paper, the image attribute as well as the accuracy of the conversion table and the state of compression with regard to each conversion table. The computer 80 refers to this mapping table and selects one suitable conversion table corresponding to the printing conditions.

The selected conversion table is transferred from the computer 80 to the data converter 10 (step S220). In the event that the selected conversion table has been compressed or has an accuracy different from a predetermined accuracy, the computer 80 may carry out the decoding of the conversion table or the adjustment of the accuracy of the conversion table before transferring the selected conversion table to the data converter 10. The compression of the conversion table or the lowered accuracy of the conversion table reduces the required storage capacity for the conversion table. When the computer 80 carries out the adjustment of the accuracy of the conversion table before the output of the conversion table to the data converter 10, there is no need of storing the conversion tables having the fixed accuracy in the hard disk 84.

Figure 12:
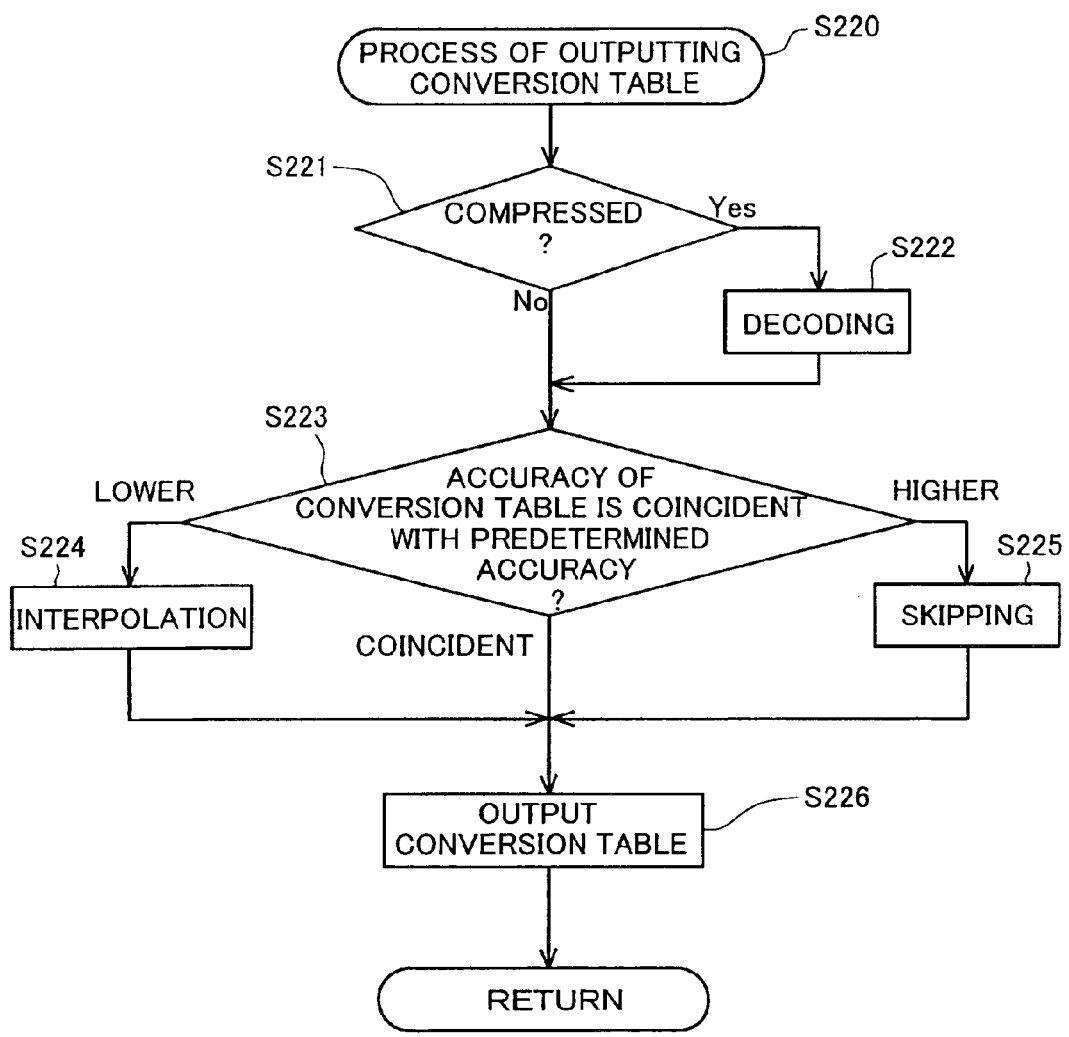
FIG. 12 is a flowchart showing a conversion table output routine executed in the embodiment.

FIG. 12 is a flowchart showing the process of outputting the conversion table in the case where the computer 80 carries out the decoding of the conversion table and the adjustment of the accuracy of the conversion table. The CPU 81 in the computer 80 first determines whether or not the selected conversion table has been compressed (step S221). The determination of step S221 is carried out by referring to the mapping table shown in FIG. 11. One modified application writes the state of compression in a header section of data and the determination of step S221 may be performed by referring to the header section of data. In the case where the conversion table has been compressed, the CPU 81 decodes the compressed conversion table (step S222) and subsequently determines whether or not the accuracy of the conversion table is coincident with a predetermined accuracy (step S223). The determination of step S223 is also carried out by referring to the mapping table shown in FIG. 11. In the case where the conversion table has a lower accuracy, data are interpolated to raise the accuracy of the conversion table to the predetermined accuracy (step S224). In the case where the conversion table has a higher accuracy, on the other hand, data are skipped to lower the accuracy of the conversion table to the predetermined accuracy (step S225). The use of the high-performance CPU 81 and the mass storage RAM 83 incorporated in the computer 80 ensures the quick decoding and interpolation or skipping of data. After the completion of the series of the processing, the processed conversion table is output to the data converter 10 (step S226).

Referring back to the flowchart of FIG. 10, when the computer 80 outputs the conversion table (step S220), the data converter 10 receives and stores the conversion table (step S240). The interface 85 of the computer 80 is connected with the input interface 15 of the data converter 10 via a serial or parallel communication cable. The output conversion table is supplied to the data converter 10 through the communication cable.

In the case where the computer 80 carries out the processing including the decoding and interpolation of the conversion table as shown in FIG. 12, the data converter 10 stores the transferred conversion table into the RAM a13 without any further processing. Alternatively the data converter 10 may carry out the processing including the decoding and interpolation. In the latter case, the conversion table transferred from the computer 80 is in the compressed state and has a smaller quantity of data, thereby shortening the time period required for the transfer of the conversion table. In this case, the series of the processing shown in the flowchart of FIG. 12 is carried out by the data converter 10.

After the data converter 10 has completed the input and storage of the conversion table, the computer 80 outputs image data of interest to be printed (step S230). The image data are also supplied to the data converter 10 via the interface 85 of the computer 80, the communication cable, and the input interface 15 of the data converter 10 and temporarily registered in the RAM a13. The data converter 10 refers to the conversion table previously transferred, converts the image data registered in the RAM a13, and stores the results of the conversion into the RAM b14 (step S250). The series of the data conversion process (step S250) has already been described with the flowchart of FIG. 4.

After the completion of the data conversion process, the data converter 10 outputs the data stored in the RAM b14 to the color printer 20 via the output interface 16 (step S260). The color printer 20 creates dots of C, M, Y, and K inks on the printing paper according to the input data, thereby giving a resulting printed color image corresponding to the color original.

In the embodiment discussed above, the conversion table corresponding to an image of interest to be printed is transferred from the computer 80 to the data converter 10, and the data converter 10 uses the input conversion table to carry out conversion of image data. The data converter 10 is accordingly required to store at least one conversion table. This arrangement desirably saves the storage capacity of the RAM incorporated in the data converter 10, thereby reducing the size and the manufacturing cost of the data converter 10. The data converter 10 receives the conversion table corresponding to the preset printing conditions supplied from the computer 80, and refers to the conversion table for color conversion. This arrangement attains the high-quality color printing.

Figure 13:
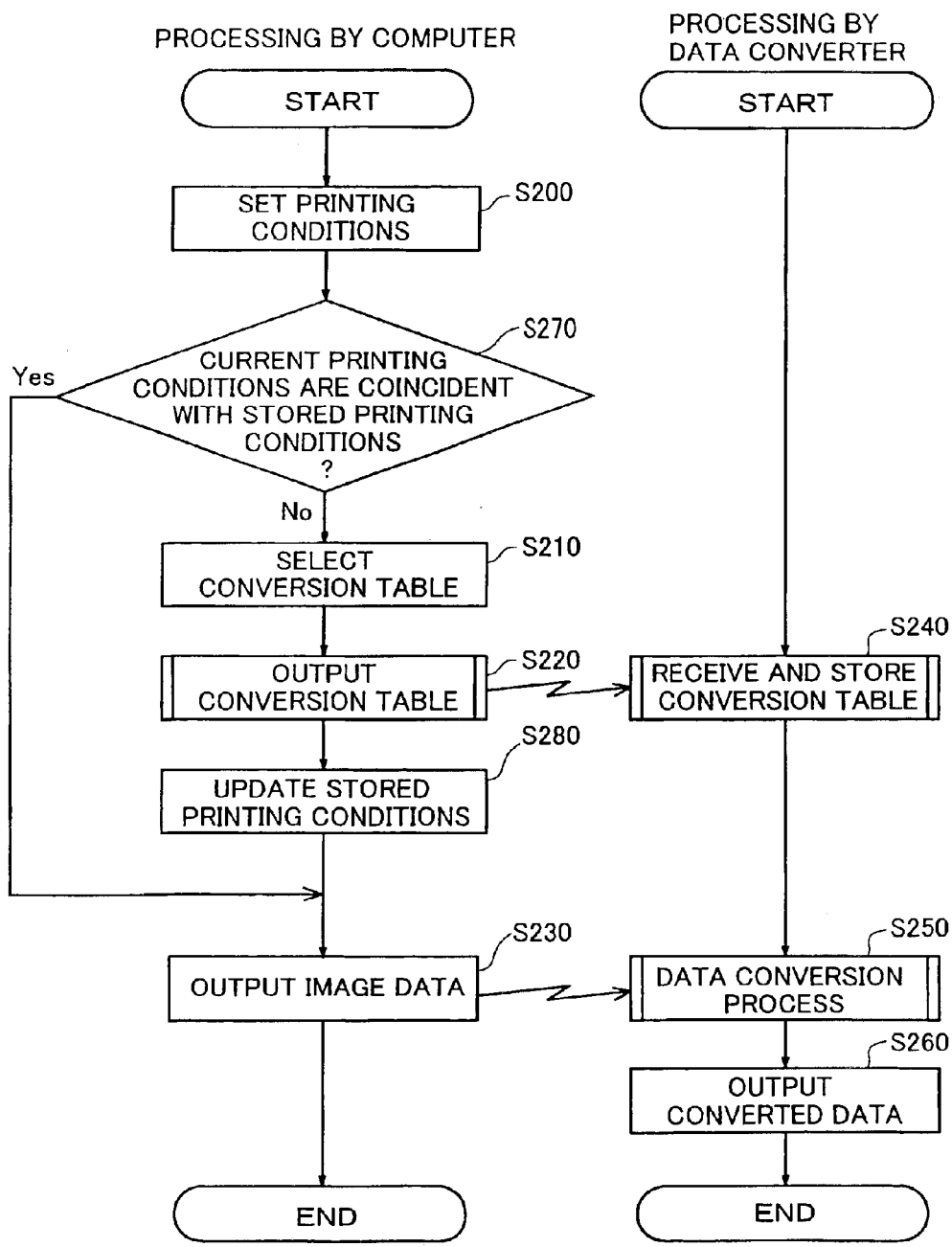
FIG. 13 is a flowchart showing another processing routine executed in the embodiment.

In accordance with one modified application, the computer 80 stores the printing conditions corresponding to the conversion table output to the data converter in the previous cycle of the processing and outputs the new conversion table to the data converter 10 only when the current printing conditions of image are different from the stored printing conditions. FIG. 13 is a flowchart showing the processing in this application. The difference from the processing of the embodiment shown in the flowchart of FIG. 10 is that the procedure of the modified arrangement sets the current printing condition (step S200) and subsequently compares the current printing conditions with the previous printing conditions stored in the previous cycle for identification (step S270). In the case where the current printing conditions are coincident with the previous printing conditions, the conversion table that has been referred to in the previous cycle of data conversion can be used again. The conversion table has already been stored in the RAM a13 of the data converter 10. The computer 80 accordingly does not carry out the processing including the selection and output of the conversion table but starts the output of image data (step S230). In the case where the current printing conditions are not coincident with the previous printing conditions, on the other hand, the conversion table stored in the RAM a13 of the data converter 10 is not applicable for the current printing conditions. The computer 80 thus newly selects an appropriate conversion table (step S210), outputs the selected conversion table to the data converter 10, and stores the current printing conditions into the RAM 83 of the computer 80 (step S280). The data converter 10 stores the newly transferred conversion table into the RAM a13 (step S240) and refers to this conversion table to carry out conversion of the image data output from the computer 80 (step S260). This arrangement desirably prevents the conversion table from being wastefully output from the computer 80 when there is no requirement of rewriting the conversion table in the data converter 10.

Figure 14:
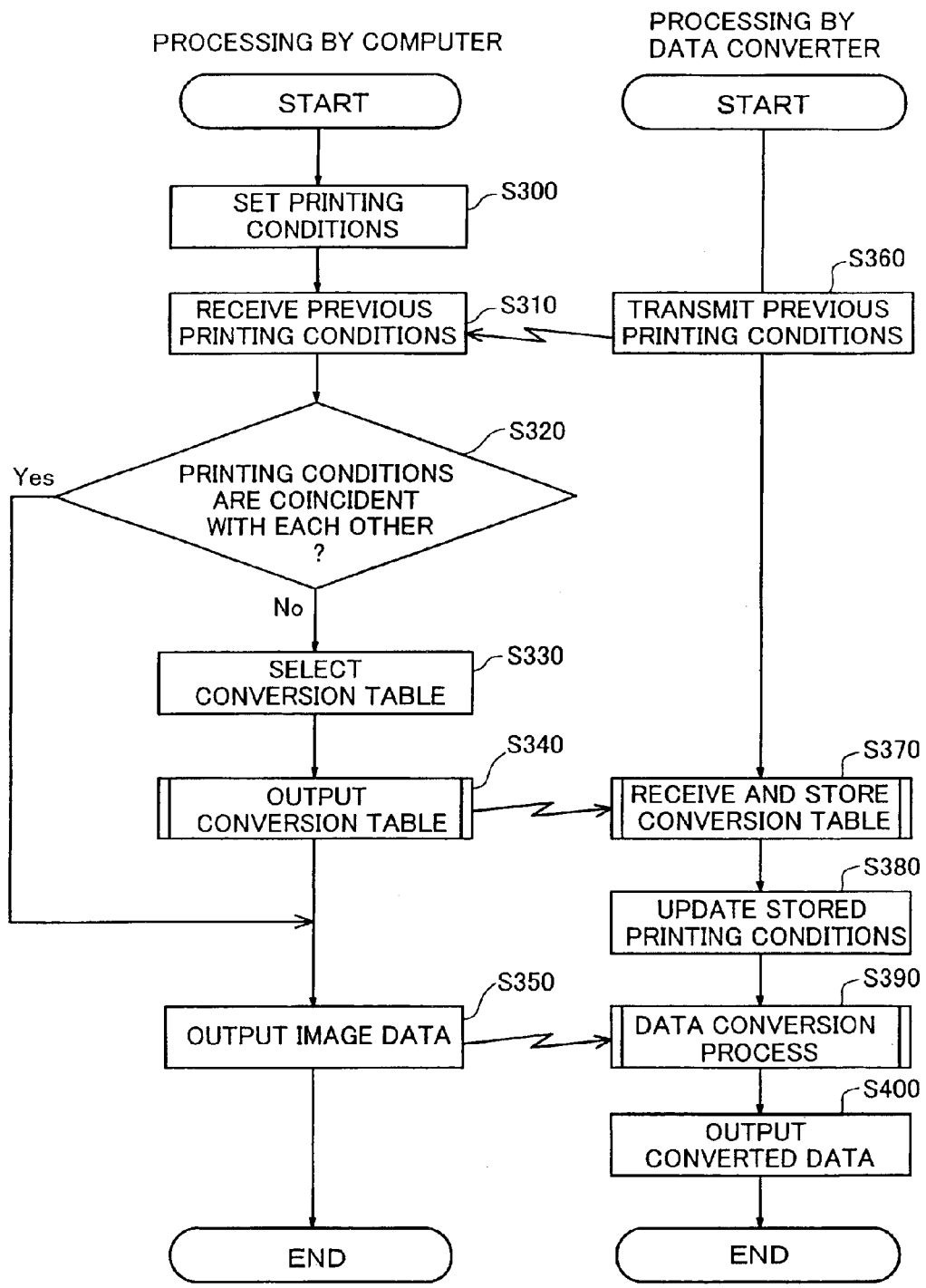
FIG. 14 is a flowchart showing still another processing routine executed in the embodiment.

A diversity of other techniques may be applied to the arrangement of identifying the printing conditions and transferring the conversion table to the data converter 10 only on the required occasions. FIG. 14 is a flowchart showing one of such available techniques. In this method, the data converter 10 stores the printing conditions in the previous cycle of the processing and transmits the previous printing conditions to the computer 80 (step S360). The computer 80 compares the previous printing conditions transmitted from the data converter 10 with the current printing conditions for identification (step S320). In the case of the non-coincidence, the computer 80 selects the conversion table (step S330) and outputs the selected conversion table (step S340). In the case where the printing conditions transmitted from the data converter 10 are coincident with the current printing conditions, on the other hand, it is thought that the appropriate conversion table suitable for the current printing conditions have already been stored in the RAM a13 of the data converter 10. The computer 80 accordingly does not carry out the selection or output of the conversion table but starts the output of image data to the data converter 10 (step S350). This arrangement desirably causes the conversion table to be transmitted from the computer 80 only when it is required to change the conversion table stored in the data converter 10. In the technique of this modified application, the printing conditions are stored in the data converter 10. The computer 80 receives the stored printing conditions and determines the requirement of the transmission of a new conversion table. When the data converter 10 connected to the computer 80 is replaced by another data converter after the printing operation of a certain image, this arrangement ensures the correct determination of the requirement of the transmission of a new conversion table in the process of printing a next image.

Figure 15:
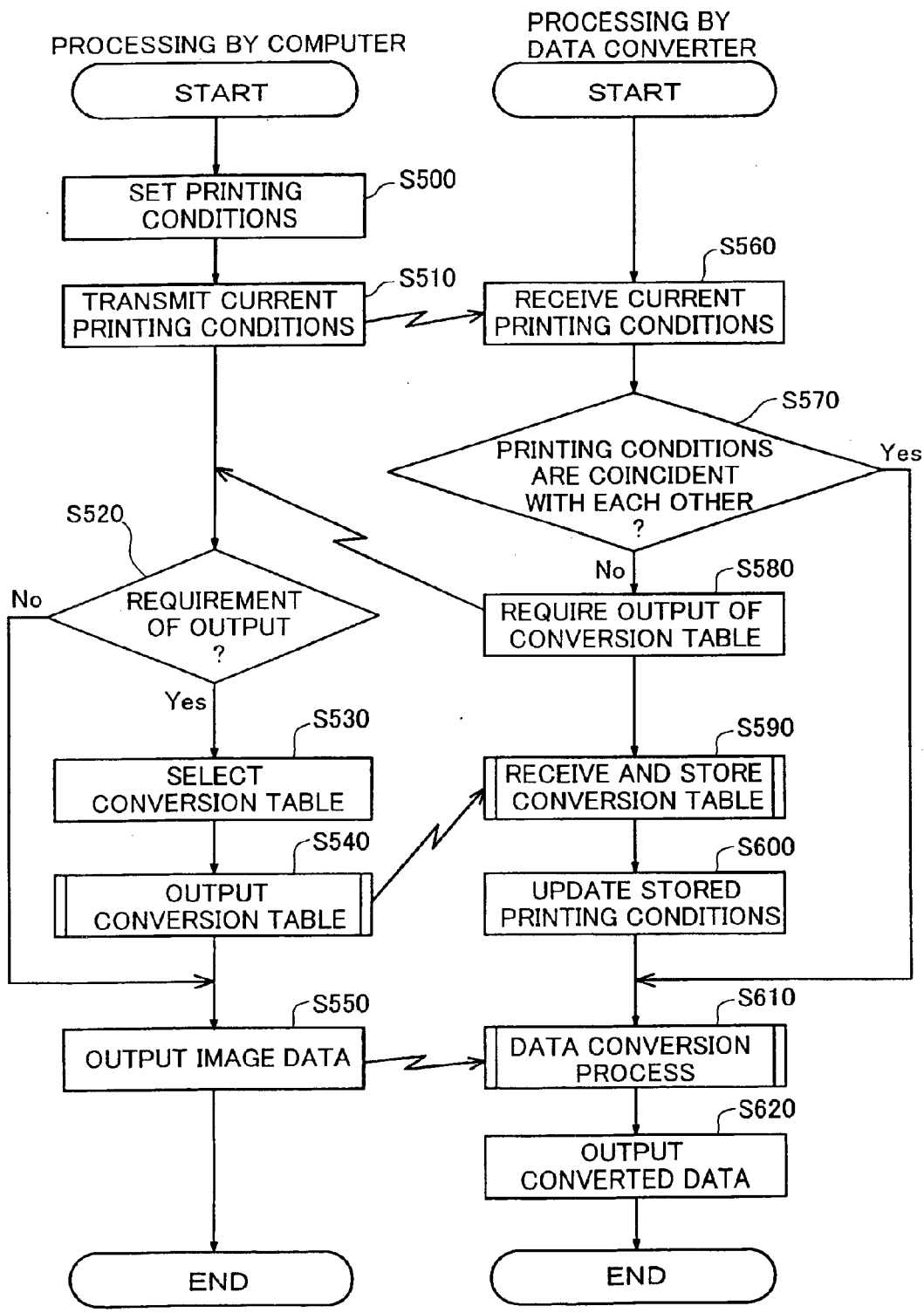
FIG. 15 is a flowchart showing another processing routine executed in the embodiment.

The technique shown in FIG. 15 may also be applied to determine the requirement of the output of the conversion table. After setting the current printing conditions (step S500), the computer 80 transmits the current printing conditions to the data converter 10 (step S510). The data converter 10 compares the transmitted printing conditions with the previously stored printing conditions for identification (step S570). In the case where these conditions are not coincident with each other, the data converter 10 requires the computer 80 to output a new conversion table (step S580). In the case where these conditions are coincident with each other, the data converter 10 can perform the data conversion by referring to the conversion table stored in the RAM a13 of the data converter 10. The data converter 10 accordingly does not perform the processing including the requirement of the output, of the new conversion table but starts the data conversion process. In response to the requirement of the output of the new conversion table from the data converter 10 (step S520), the computer 80 selects an appropriate conversion table corresponding to the current printing conditions (step S530) and outputs the selected conversion table to the data converter 10 (step S540). When there is no requirement of the output of the new conversion table, on the other hand, the computer 80 does not carry out the processing including the selection and output of the conversion table but immediately starts the output of image data (step S550). This arrangement also causes the conversion table to be transmitted only when it is required to change the conversion table stored in the data converter 10.

Figure 16:
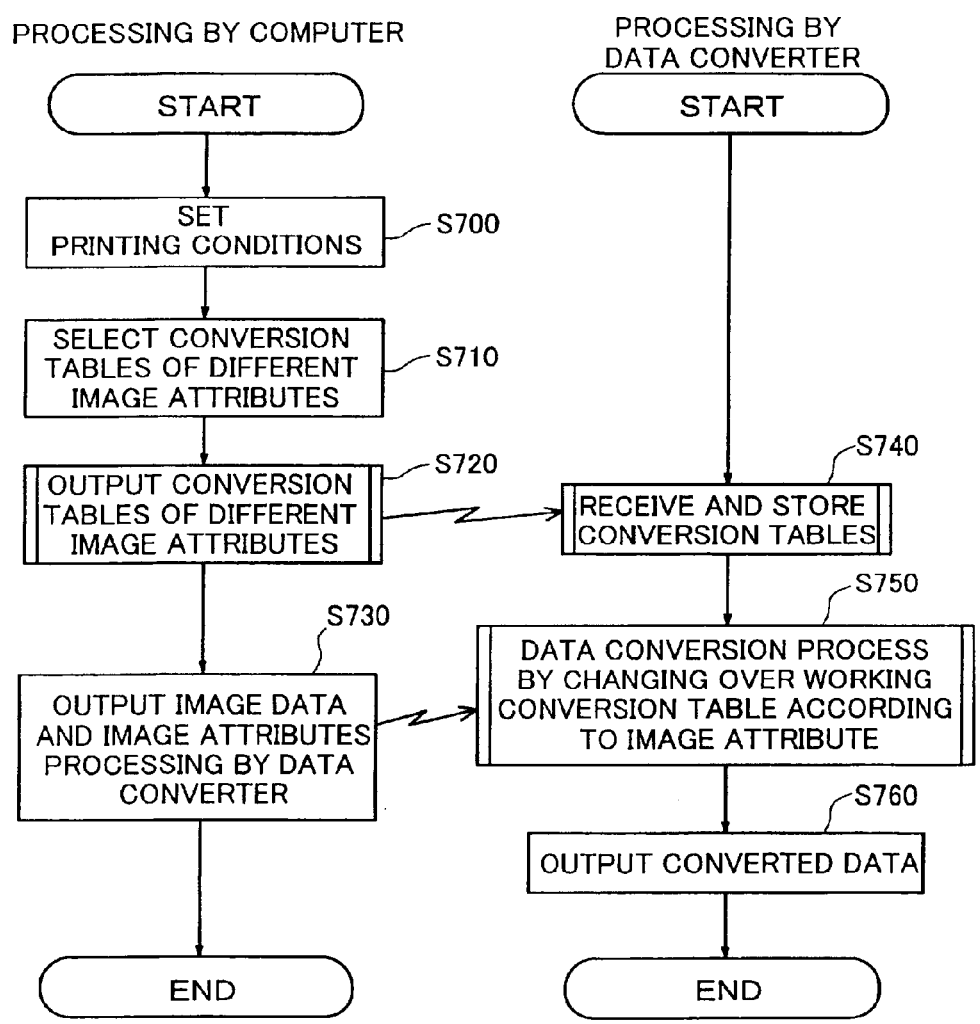
FIG. 16 is a flowchart showing a processing routine that carries out data conversion by changing over a working conversion table according to the image attribute.

When the computer 80 is capable of analyzing an image of interest to be printed and specifies the image attribute, the conversion table is selectively used according to the image attribute as discussed below. FIG. 16 is a flowchart showing a printing operation executed by the computer and the data converter in this application. A diversity of conversion tables mapped to the respective combinations of the printing resolution of the printing apparatus, the type of printing paper, and the image attribute of the image to be printed are stored in advance in the hard disk 84 of the computer 80. After setting the printing conditions of image (step S700), the computer 80 selects a plurality of conversion tables having different image attributes according to the printing resolution and the type of printing paper among the diversity of the stored conversion tables (step S710) and outputs all the selected conversion tables to the data converter 10 (step S720). The data converter 10 receives the selected conversion tables and stores them into the RAM a13 (step S740). The computer subsequently analyzes image data of interest to be printed, specifies the image attribute with regard to each pixel, and outputs the specified image attributes in addition to the image data to the data converter 10 (step S730). The data converter 10 changes over the working conversion table to be referred to in the unit of pixel, which is selected among the plurality of conversion tables stored in the RAM a13, based on the specified image attribute (step S750). This arrangement preferably enables the data conversion to be carried out by referring to the appropriate conversion table according to the image attribute.

There is a tendency that the respective image attributes do not appear at random in one image but an identical image attribute appears in somewhat continuous manner. One preferable procedure does not select the working conversion table for data conversion according to the image attribute with regard to each pixel but detects the variation in image attribute. In response to the variation in image attribute, the working conversion table to be referred to is selected. This arrangement desirably attains the quicker data conversion.

Figure 17:
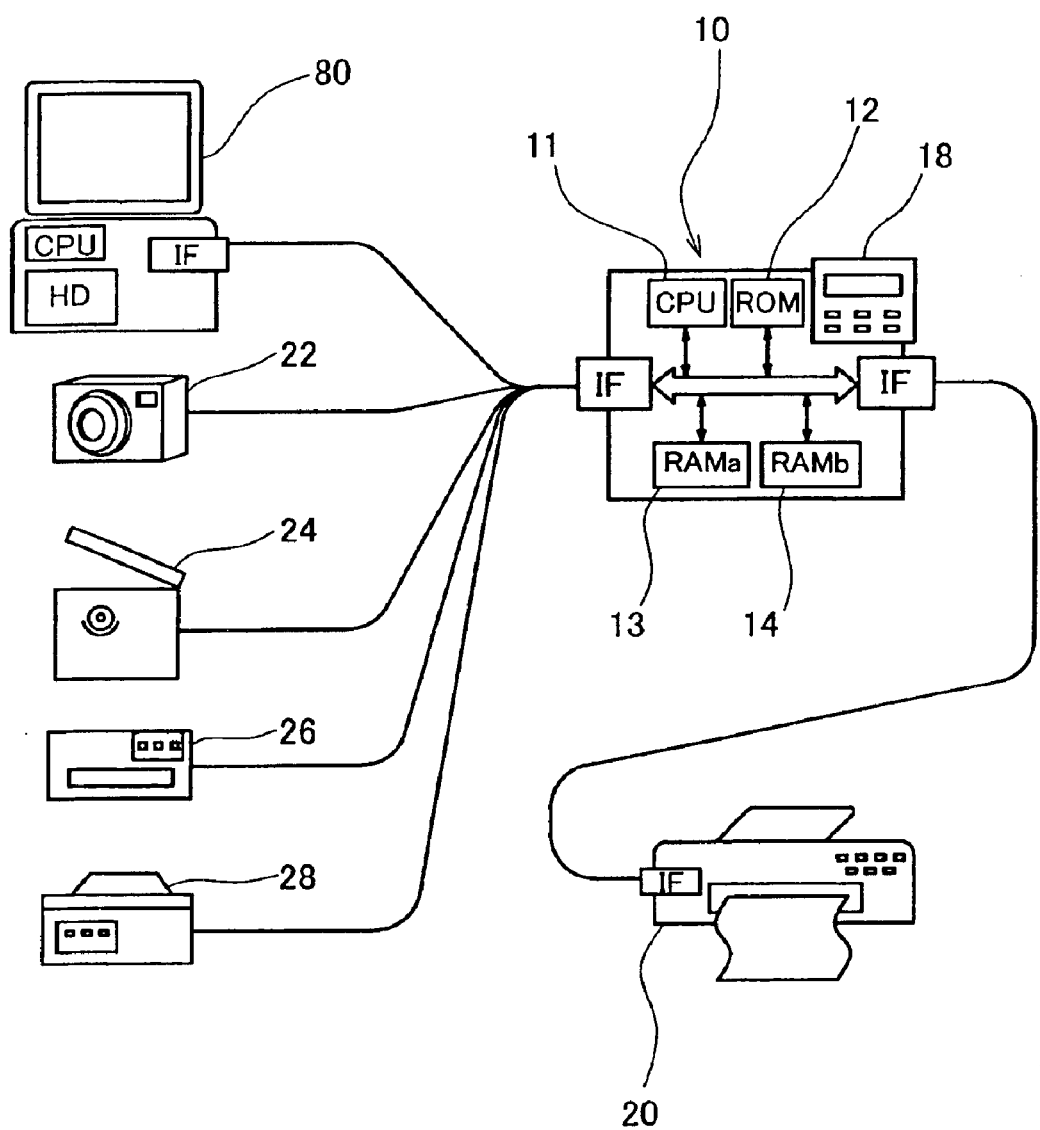
FIG. 17 is a block diagram showing a supply of image data from imaging devices, such as a digital camera, in the embodiment.

In the embodiment and its modified applications discussed above, the image data are transmitted from the computer 80 to the data converter 10. The device of supplying image data is, however, not restricted to the computer. For example, image data may be supplied from any of various imaging devices, such as a digital camera 22, a color scanner 24, a film scanner 28, and a video printer 26 shown in FIG. 17, to the data converter 10. The data converter 10 then converts the image data into a specific data form printable by the printer 20. In this application, a plurality of conversion tables are stored in the RAM a13 or the ROM 12 of the data converter 10. The CPU 11 in the data converter 10 selects an appropriate conversion table corresponding to the printing conditions. The printing conditions may be supplied from the imaging device to the data converter 10 prior to the supply of image data. In accordance with another preferable application, the operator previously sets the printing conditions on the setting panel 18, and the CPU 11 selects the appropriate conversion table corresponding to the preset printing conditions. The CPU 11 refers to the selected conversion table, converts the supplied image data into the printable data form, and outputs the converted image data to the printer 20. This arrangement preferable enables an image shot by the imaging device, for example, the digital camera 22, to be printed by the printer 20 without using the computer 80.

In the case where the data converter 10 does not store the appropriate conversion table, the computer 80, in place of the imaging device, may be connected to the data converter 10 and overwrite the contents of storage in the RAM a13 of the data converter 10 with one or a plurality of conversion tables selected among the conversion tables stored in the hard disk 84 of the computer 80. The operation of selecting the conversion tables among those stored in the hard disk 84 and writing the selected conversion tables into the RAM a13 of the data converter 10 is readily implemented by the function of the operating system running on the computer 80. This arrangement enables the conversion tables to be read from the computer 80 according to the requirements, and thus desirably saves the storage capacity of the data converter 10.

Figure 18:
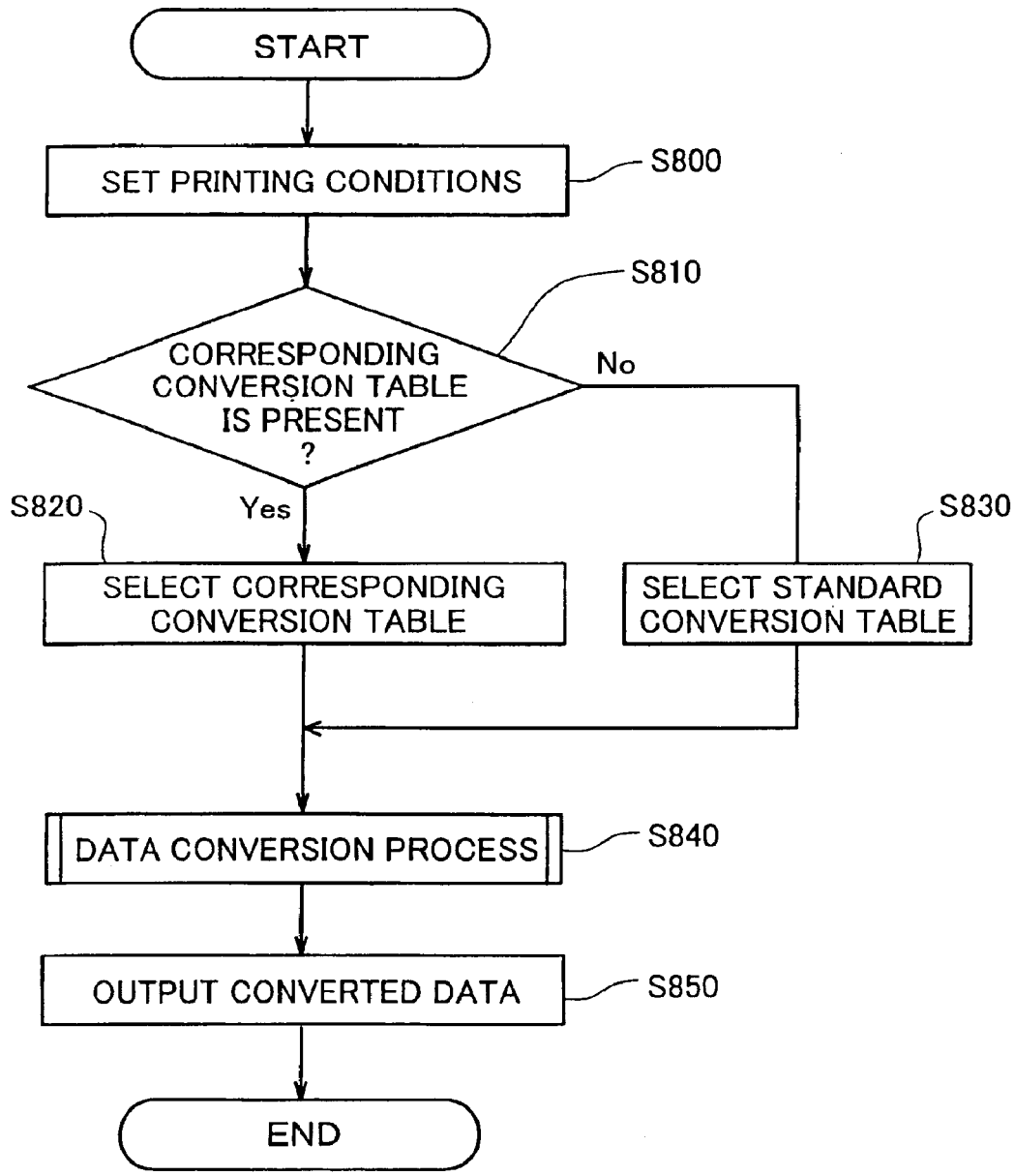
FIG. 18 is a flowchart showing a processing routine that carries out data conversion using a standard conversion table.

Another preferable procedure stores a standard conversion table in the data converter 10 and, in the case where the appropriate conversion table is not present in either RAM a13 or the ROM 12, refers to the standard conversion table for the data conversion. FIG. 18 is a flowchart showing an operation of the data converter in the case of converting image data input from, for example, the digital camera 22. The operator first specifies the printing conditions on the setting panel 18 of the data converter 10 (step S800). The CPU 11 determines whether or not the conversion table corresponding to the specified printing conditions is stored in either the RAM a13 or the ROM 12 (step S810). When the corresponding conversion table is present, the CPU 11 selects the corresponding conversion table (step S820). When the corresponding conversion table is not present, on the other hand, the CPU 11 selects the standard conversion table stored in the ROM 12 (step S830). The CPU 11 refers to the selected conversion table, so as to convert the data form of the image data supplied from the imaging device (step S840) and outputs the converted image data to the printer 20 (step S850). The use of the appropriately selected standard conversion table ensures the fairly satisfactory image printing even when the corresponding conversion table is not present. In the example of FIG. 18, the data converter 10 receives the image data from the imaging device. The technique is, however, not restricted to this arrangement, but may be applicable to the arrangement of receiving the image data from the computer 80.

Figure 19A:
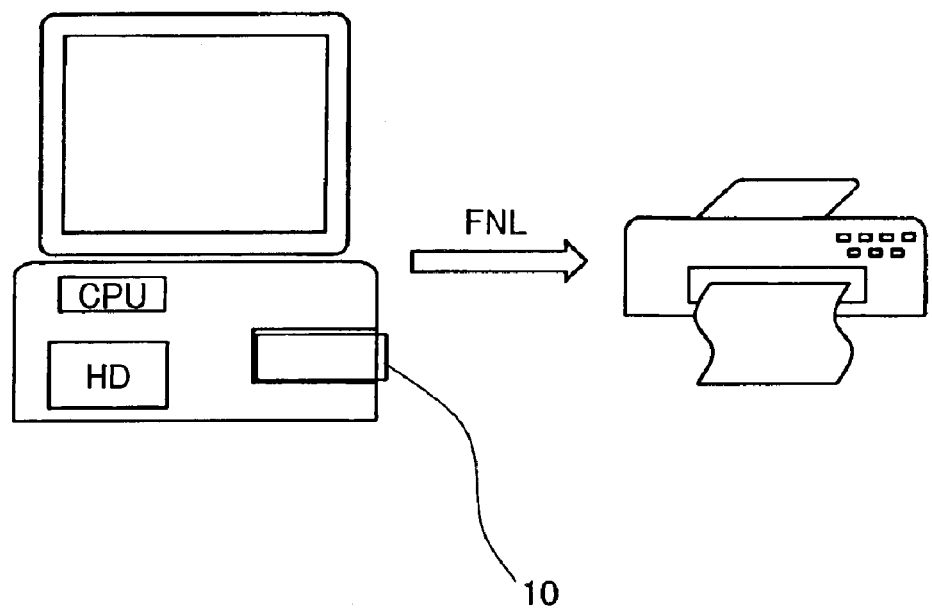
FIG. 19 illustrates other possible applications of the embodiment.
Figure 19B:
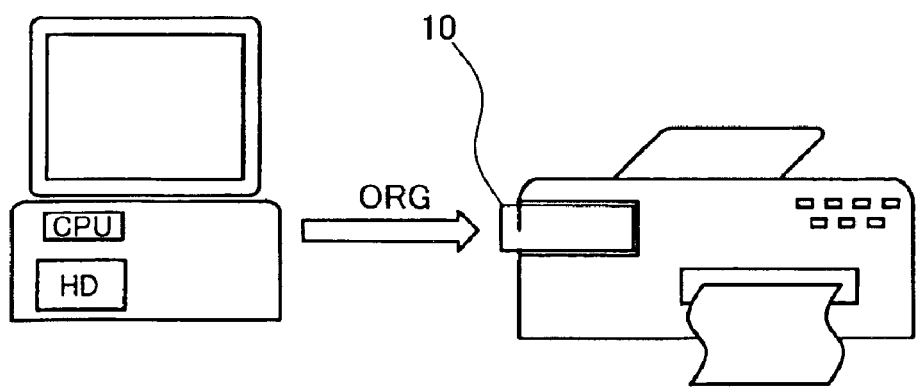

The present invention is not restricted to the above embodiment or its modifications, but there may be many other modifications, changes, and alterations without departing from the scope or spirit of the main characteristics of the present invention. In the above embodiment and its modified examples, the data converter 10 is constructed as a visually tin separate body from the computer 80 and the printer 20. It is, however, not necessary that the data converter 10 is a visually separate body. For example, the respective functions of the data converter 10 may be incorporated in an extension board or an extension card, which is inserted in an extension slot of the computer 80 or the printer (see FIG. 19). In these examples, the data converter 10 is visually integrated with the computer or the printer.

Industrial Applicability

As described above, the technique adopted in the data converter, the computer, and the printing apparatus of the present invention enables an appropriate conversion table corresponding to the printing conditions of a color image to be read from the computer and used for data conversion. This arrangement enables adequate data conversion and attains high-quality color image printing, regardless of the printing conditions of the color image.

What is claimed is:

1. A data converter configured to convert color image data input from a computer into a specific data form expressible with ink provided in a printing apparatus by referring to a preset conversion table and configured to output the converted image data, said data converter comprising:

a conversion table receiving unit configured to receive said conversion table from said computer in accordance with a current printing condition of an image, a conversion table storage unit configured to store the received conversion table in a storage unit configured to store the conversion table in a rewritable memory;

an input unit configured to receive the color image data output from said computer;

a conversion unit configured to refer to the conversion table stored in said storage unit and configured to convert the color image data received by said input unit into the specific data form; and an output unit configured to output the converted image data;

said data converter being constructed as separate body from said computer, wherein the current printing condition includes at least one of a medium type, a printing resolution, an image attribute, and an ink type, the image attribute corresponding to whether or not a currently processed image is a natural image.

2. A data converter in accordance with claim 1, said data converter further comprising:

a decoder unit configured to receive the conversion table compressed in advance by and supplied from said computer and configured to decode the compressed conversion table to be expanded in said storage unit.

3. A data converter in accordance with claim 1, said data converter further comprising:
an interpolation unit configured to interpolate the conversion table supplied from said computer to a predetermined accuracy and configured to expand the interpolated conversion table in said storage unit.

4. A data converter in accordance with claim 1, wherein said input unit receives a current printing condition of image in said printing apparatus, in addition to the color image data, and comprises a unit configured to receive, when the input printing condition received by said input unit is not coincident with a printing condition corresponding to the conversion table stored in said storage unit, another conversion table corresponding to the input printing condition from said computer.

5. A data converter in accordance with claim 1, wherein said input unit receives the image attribute, which represents whether or not a currently processed image is a natural image, from said computer, in addition to the color image data,
said storage unit stores a plurality of conversion tables including different image attributes, the plurality of conversion tables being selected by said computer at least based on combinations of a printing resolution of said printing apparatus and a type of printing paper and supplied from said computer, and
said conversion unit changes over a working conversion table to be referred to for the conversion of the color image data in a unit of pixel and carries out the conversion of the color image data, the working conversion table being selected among the plurality of conversion tables stored in said storage unit based on the image attribute received by said input unit.

6. A computer configured to supple color image data to a data converter, said data converter converting the color image data into a specific data form expressible with coloring material provided in a printing apparatus by referring to a preset conversion table, and outputting the converted image data, said computer comprising:
an image data output unit configured to output the color image data to said data converter;
a conversion table storage unit configured to store a diversity of the conversion tables mapped to a diversity of printing conditions of image;
a conversion table selection unit configured to select a working conversion table corresponding to a current printing condition of an image in said printing apparatus, among the diversity of conversion tables stored in said conversion table storage unit; and
a conversion table output unit configured to output the selected conversion table to said data converter, prior to the conversion of the color image data, wherein said computer is constructed as a separate body from said data converter, and the current printing condition includes at least one of a medium type, a printing resolution, an image attribute, and an ink type, the image attribute corresponding to whether or not a currently processed image is a natural image.

7. A computer in accordance with claim 6, wherein said conversion table storage unit stores the diversity of conversion tables in a compressive manner, and
said conversion table output unit decodes the compressed conversion table selected by said conversion table selection unit and outputs the decoded conversion table to said data converter.

8. A computer in accordance with claim 6, said computer further comprising:
a conversion table interpolation unit configured to interpolate the working conversion table selected by said conversion table selection unit to a predetermined accuracy,
wherein said conversion table output unit outputs the conversion table interpolated by said conversion table interpolation unit.

9. A computer in accordance with claim 6, wherein said conversion table selection unit selects the working conversion table, at least based on the combination of a printing resolution of said printing apparatus and a type of printing paper.

10. A computer in accordance with claim 6, said computer further comprising:
a condition storage unit configured to store a printing condition corresponding to the latest conversion table output to said data converter; and
an identification unit configured to compare the current printing condition of image in said printing apparatus with the printing condition stored in said condition storage unit, in order to carry out identification,
wherein said conversion table output unit outputs the selected conversion table and updates the printing condition stored in said condition storage unit, when said identification unit determines that the two printing conditions are not coincident with each other.

11. A computer in accordance with claim 6, said computer further comprising:
an image attribute generation unit configured to generate the image attribute, which represents whether or not a currently processed image to be printed is a natural image,
wherein said conversion table storage unit stores the diversity of conversion tables mapped to respective combinations of conditions, which include at least the printing resolution of said printing apparatus, a type of printing paper, and the image attribute,
said conversion table selection unit selects a plurality of conversion tables including different image attributes, at least based on combinations of the printing resolution of said printing apparatus and the type of printing paper,
said conversion table output unit outputs the plurality of selected conversion tables, and
said image data output unit outputs the image attribute in addition to the color image data, and comprises a unit that changes over a working conversion table, which is referred to by said data converter for the data conversion, in a unit of pixel based on the image attribute.

12. A data converter configured to convert color image data input from an imaging device, such as a digital camera or a color scanner, into a specific data form expressible with coloring material provided in a printing apparatus by referring to a preset conversion table and configured to output the converted image data,
said data converter comprising:
a conversion table storage unit configured to store a diversity of the conversion tables mapped to a diversity of printing conditions of an image;
a conversion table selection unit configured to select a working conversion table corresponding to a current printing condition of image, among the diversity of conversion tables stored in said conversion table selection unit;

an input unit that receives the color image data;

a conversion unit configured to convert the color image data received by said input unit by referring to the working conversion table selected by said conversion table selection unit; and an output unit configured to output the converted image data, wherein said data converter is constructed as a separate body from said imaging device, and the current printing condition includes at least one of a medium type, a printing resolution, an image attribute, and an ink type, the image attribute corresponding to whether or not a currently processed image is a natural image.

13. A data converter in accordance with claim 12, wherein said conversion table storage unit is a rewritable storage unit, and comprises:

a rewrite unit configured to rewrite the contents of storage in said conversion table storage unit, based on a conversion table transferred from said imaging device.

14. A data converter in accordance with claim 13, said data converter further comprising:

a rewrite unit configured to communicate with a computer, which is constructed as a separate body from said data converter, to receive a conversion table transferred from said computer, and configured to rewrite the contents of storage in said conversion table storage unit based on the transferred conversion table.

15. A data converter in accordance with claim 12, said data converter further comprising:

a standard storage unit configured to store a standard conversion table in advance, wherein said conversion unit refers to the standard conversion table stored in said standard storage unit and converts the color image data when the conversion table corresponding to the current printing condition of image is not present in the diversity of the conversion tables stored in said conversion table storage unit.

16. A printing system comprising:

a data converter in accordance with either one of claims 1 and 12; and a printing apparatus configured to receive image data having a specific data form converted by said data converter and configured to print an image corresponding to the input image data, wherein said data converter is constructed integrally with said printing apparatus.

17. A method of converting color image data output from a computer into a specific data form expressible with coloring material provided in a printing apparatus by referring to a preset conversion table, and outputting the converted image data, said method comprising:

selecting a conversion table corresponding to a current printing condition of an image among a diversity of conversion tables stored in advance in said computer;

storing the selected conversion table in a rewritable memory in a data converter, which is provided separately from said computer; and referring to the stored conversion table, so as to convert the image data supplied from said computer, wherein the current printing condition includes at least one of a medium type, a printing resolution, an image attribute, and an ink type, the image attribute corresponding to whether or not a currently processed image is a natural image.

18. A data converter configured to convert color image data input from a computer into a specific data form expressible with ink provided in a printing apparatus by referring to a preset conversion table and configured to output the converted image data, said data converter comprising:

a storage unit configured to store the conversion table in a rewritable manner, the conversion table being supplied from said computer corresponding to a current printing condition of an image in said printing apparatus;

an input unit configured to receive the color image data output from said computer, a conversion unit configured to refer to the conversion table stored in said storage unit and configured to convert the color image data received by said input unit into the specific data form; and an output unit configured to output the converted image data, said data converter being constructed as separate body from said computer, wherein said input unit receives an image attribute, which represents whether or not a currently processed image is a natural image, from said computer, in addition to the color image data, said storage unit stores a plurality of conversion tables including different image attributes, the plurality of conversion tables being selected by said computer at least based on combinations of a printing resolution of said printing apparatus and a type of printing paper and supplied from said computer, and said conversion unit changes over a working conversion table to be referred to for the conversion of the color image data in a unit of pixel and carries out the conversion of the color image data, the working conversion table being selected among the plurality of conversion tables stored in said storage unit based on the image attribute received by said input unit.

19. A computer configured to supply color image data to a data converter, said data converter converting the color image data into a specific data form expressible with coloring material provided in a printing apparatus by referring to a preset conversion table, and outputting the converted image data, said computer comprising:

an image data output unit configured to output the color image data to said data converter;

a conversion table storage unit configured to store a diversity of the conversion tables mapped to a diversity of printing conditions of an image;

a conversion table selection unit configured to select a working conversion table corresponding to a current printing condition of image in said printing apparatus, among the diversity of conversion tables stored in said conversion table storage unit; and a conversion table output unit configured to output the selected conversion table to said data converter, prior to the conversion of the color image data, wherein said computer is constructed as a separate body from said data converter, said computer further comprising:

a condition storage unit configured to store a printing condition corresponding to the latest conversion table output to said data converter; and an identification unit configured to compare the current printing condition of image in said printing apparatus with the printing condition stored in said condition storage unit, in order to carry out identification, wherein said conversion table output unit outputs the selected conversion table and updates the printing condition stored in said condition storage unit, when said identification unit determines that the two printing conditions are not coincident with each other.

20. A computer configured to supply color image data to a data converter, said data converter converting the color image data into a specific data form expressible with coloring material provided in a printing apparatus by referring to a preset conversion table, and outputting the converted image data, said computer comprising:

an image data output unit configured to output the color image data to said data converter;

a conversion table storage unit configured to store a diversity of the conversion tables mapped to a diversity of printing conditions of an image;

a conversion table selection unit configured to select a working conversion table corresponding to a current printing condition of image in said printing apparatus, among the diversity of conversion tables stored in said conversion table storage unit; and a conversion table output unit configured to output the selected conversion table to said data converter, prior to the conversion of the color image data, wherein said computer is constructed as a separate body from said data converter, said computer further comprising:

an image attribute generation unit configured to generate an image attribute, which represents whether or not a currently processed image to be printed is a natural image, wherein said conversion table storage unit stores the diversity of conversion tables mapped to respective combinations of conditions, which include at least a printing resolution of said printing apparatus, a type of printing paper, and the image attribute, said conversion table selection unit selects a plurality of conversion tables including different image attributes, at least based on combinations of the printing resolution of said printing apparatus and the type of printing paper, said conversion table output unit outputs the plurality of selected conversion tables, and said image data output unit outputs the image attribute in addition to the color image data, and comprises a unit that changes over a working conversion table, which is referred to by said data converter for the data conversion, in a unit of pixel based on the image attribute.

* * * * *